(12) United States Patent
Yoo et al.

(10) Patent No.: US 11,733,486 B2
(45) Date of Patent: *Aug. 22, 2023

(54) OPTICAL IMAGING SYSTEM INCLUDING FIRST TO FOURTH LENSES

(71) Applicant: SAMSUNG ELECTRO-MECHANICS CO., LTD., Suwon-si (KR)

(72) Inventors: Ho Sik Yoo, Suwon-si (KR); Dong Shin Yang, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/862,161

(22) Filed: Jul. 11, 2022

(65) Prior Publication Data

US 2022/0350115 A1    Nov. 3, 2022

Related U.S. Application Data

(63) Continuation of application No. 16/541,632, filed on Aug. 15, 2019, now Pat. No. 11,415,776.

(30) Foreign Application Priority Data

| Sep. 14, 2018 | (KR) | 10-2018-0110440 |
| Nov. 27, 2018 | (KR) | 10-2018-0148945 |
| Aug. 1, 2019 | (KR) | 10-2019-0093864 |

(51) Int. Cl.
*G02B 13/00* (2006.01)
*G02B 3/00* (2006.01)
(Continued)

(52) U.S. Cl.
CPC ......... *G02B 13/004* (2013.01); *G02B 3/0062* (2013.01); *G02B 27/123* (2013.01); *H04N 23/55* (2023.01); *G03B 13/36* (2013.01)

(58) Field of Classification Search
CPC .. G02B 13/004; G02B 3/0062; G02B 27/123; G02B 13/001; G02B 13/02; H04N 5/2254; G03B 30/00
See application file for complete search history.

(56) References Cited

U.S. PATENT DOCUMENTS

| 9,104,010 B2 | 8/2015 | Ohashi |
| 9,341,813 B1 | 5/2016 | Lin et al. |

(Continued)

FOREIGN PATENT DOCUMENTS

| CN | 1837942 A | 9/2006 |
| CN | 205679846 U | 11/2016 |

(Continued)

OTHER PUBLICATIONS

Chinese Office Action dated May 7, 2021 issued in counterpart Chinese Patent Application No. 201910831749.3. (12 pages in English)(12 pages in Chinese).

(Continued)

*Primary Examiner* — Alicia M Harrington
(74) *Attorney, Agent, or Firm* — NSIP Law

(57) ABSTRACT

An optical imaging system includes a first lens having positive refractive power, a second lens, a third lens, and a fourth lens, arranged sequentially from an object side along an optical axis. The first lens through the fourth lens are spaced apart from each other along the optical axis in a paraxial region. A total focal length f of a lens unit including the first lens through the fourth lens and half (IMG HT) of a diagonal length of an imaging surface of an image sensor satisfy f/IMG HT>4.9. An effective aperture radius of an object-side surface of the first lens and an effective aperture radius of an object-side surface of the second lens are both greater than effective aperture radii of an object-side surface (Continued)

and an image-side surface of each of the lenses other than the first lens and the second lens.

18 Claims, 25 Drawing Sheets

(51) Int. Cl.
*G02B 27/12* (2006.01)
*H04N 23/55* (2023.01)
*G03B 13/36* (2021.01)

(56) References Cited

U.S. PATENT DOCUMENTS

| | | |
|---|---|---|
| 9,645,355 B2 | 5/2017 | Son |
| 9,989,741 B1 | 6/2018 | Hsueh et al. |
| 10,295,799 B2 | 5/2019 | Asami et al. |
| 2006/0280498 A1 | 12/2006 | Souma et al. |
| 2012/0069239 A1* | 3/2012 | Ohki .................... G02B 13/004 348/E5.045 |
| 2013/0287383 A1 | 10/2013 | Haruguchi et al. |
| 2016/0209624 A1 | 7/2016 | Usui |
| 2016/0356988 A1 | 12/2016 | Liu et al. |
| 2017/0212336 A1 | 7/2017 | Ko |
| 2017/0219799 A1 | 8/2017 | Hsueh et al. |
| 2018/0017767 A1 | 1/2018 | Chen |
| 2018/0059376 A1 | 3/2018 | Lin et al. |
| 2018/0143403 A1 | 5/2018 | Tseng et al. |
| 2018/0180847 A1 | 6/2018 | Yoo |
| 2018/0335618 A1 | 11/2018 | Huang et al. |
| 2019/0243112 A1* | 8/2019 | Yao .......................... G02B 7/09 |

FOREIGN PATENT DOCUMENTS

| | | |
|---|---|---|
| CN | 106249380 A | 12/2016 |
| CN | 106291888 A | 1/2017 |
| CN | 107015344 A | 8/2017 |
| CN | 207516711 U | 6/2018 |
| CN | 105572847 B | 8/2018 |
| JP | 2012-163831 A | 8/2012 |
| JP | 2013-228610 A | 11/2013 |
| JP | 2016-133528 A | 7/2016 |
| KR | 10-2016-0000759 A | 1/2016 |
| TW | 201728947 A | 8/2017 |
| TW | 201819975 A | 6/2018 |

OTHER PUBLICATIONS

Indian Office Action dated Jun. 15, 2021 issued in counterpart Indian Patent Application No. 201914034816 (6 pages in English).
Taiwanese Office Action dated Mar. 2, 2022, in counterpart Taiwanese Patent Application No. 110129121 (4 pages in English and 4 pages in Mandarin).
Taiwanese Office Action dated Sep. 2, 2020 issued counterpart Taiwanese Patent Application No. 108129756 (4 pages in English and 5 pages in Mandarin Chinese).

* cited by examiner

OPTICAL IMAGING SYSTEM INCLUDING FIRST TO FOURTH LENSES

CROSS-REFERENCE TO RELATED APPLICATIONS

This application is a continuation of U.S. patent application Ser. No. 16/541,632 filed on Aug. 15, 2019, now U.S. Pat. No. 11,415,776 issued on Aug. 16, 2022, which claims the benefit under 35 USC 119(a) of Korean Patent Application No. 10-2018-0110440 filed on Sep. 14, 2018, Korean Patent Application No. 10-2018-0148945 filed on Nov. 27, 2018, and Korean Patent Application No. 10-2019-0093864 filed on Aug. 1, 2019, in the Korean Intellectual Property Office, the entire disclosures of which are incorporated herein by reference for all purposes.

BACKGROUND

1. Field

The following description relates to an optical imaging system.

2. Description of Background

In mobile terminals, camera modules are provided, enabling video calls and image capturing to be carried out. In addition, as the functionality of camera modules in portable terminals has gradually increased, demand for high resolution, high performance camera modules in portable terminals, has also increased.

However, since portable terminals are becoming miniaturized and lightweight, limitations in implementing high-resolution and high-performance camera modules have been present.

Since a focal length and a total track length of a telephoto lens are relatively long, it may be difficult to mount the telephoto lens in a portable terminal.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

Examples provide a slim optical imaging system implementing a narrow angle of view.

In one general aspect, an optical imaging system includes a first lens having positive refractive power, a second lens, a third lens and a fourth lens, arranged sequentially from an object side along an optical axis. The first lens through the fourth lens are spaced apart from each other along the optical axis in a respective paraxial region, a total focal length f of a lens unit including the first lens through the fourth lens and half (IMG HT) of a diagonal length of an imaging surface of an image sensor satisfy f/IMG HT>4.9, and an effective aperture radius of an object-side surface of the first lens and an effective aperture radius of an object-side surface of the second lens are both greater than an effective aperture radius of an object-side surface and an effective aperture radius of an image-side surface of each of the lenses other than the first lens and the second lens.

The optical imaging system may satisfy $0.8<TTL/f<1.2$, where TTL is a distance on the optical axis from the object-side surface of the first lens to the imaging surface of the image sensor.

The optical imaging system may satisfy $3.8<f/TD12<7$, where TD12 is an optical axial distance from the object-side surface of the first lens to an image-side surface of the second lens.

The optical imaging system may satisfy $0.75<f12/f<4.5$, where f12 is a combined focal length of the first lens and the second lens.

The optical imaging system may satisfy $ER11/ER\_max>1.1$, where ER11 is the effective aperture radius of the object-side surface of the first lens, and ER_max is a maximum value of the effective aperture radius of the object-side surface and the effective aperture radius of the image-side surface of each of the lenses other than the first lens and the second lens.

The optical imaging system may satisfy $1.3<TTL/BFL<3.3$, where TTL is a distance on the optical axis from the object-side surface of the first lens to the imaging surface of the image sensor, and BFL is an optical axial distance from an image-side surface of a lens disposed closest to the image sensor to the imaging surface of the image sensor.

A focal length f1 of the first lens may be less than half of the total focal length f, and f1 may be greater than an absolute value of a focal length f2 of the second lens.

The second lens may have negative refractive power and may include a concave image-side surface, and the third lens may have positive refractive power.

A lens disposed closest to the image sensor may include a convex object-side surface in a paraxial region and in regions other than the paraxial region, and a concave image-side surface in the paraxial region.

The lens unit may include a fifth lens disposed between the fourth lens and the image sensor, and the fifth lens may have positive refractive power.

At least one of the first lens and the second lens has a noncircular shape when viewed in the optical axis direction.

The at least one of the first lens and the second lens having a noncircular shape may include a first edge and a second edge having an arc shape, and a third edge and a fourth edge connecting the first edge and the second edge to each other. A length of a virtual straight line connecting the first edge and the second edge, while passing through the optical axis, may be greater than a length of a virtual straight line connecting the third edge and the fourth edge, while passing through the optical axis.

The first lens may have a noncircular shape when viewed in the optical axis direction, a spacer having an opening may be disposed between the first lens and the second lens, and the opening of the spacer may have a noncircular shape when viewed in the optical axis direction.

In another general aspect, an optical imaging system includes a first lens having positive refractive power, a second lens having negative refractive power, a third lens, a fourth lens, and a fifth lens, arranged sequentially from an object side along an optical axis. The first lens through the fifth lens are spaced apart from each other along the optical axis in a respective paraxial region, at least one of the first lens and the second lens has a noncircular shape when viewed in the optical axis direction, a spacer having an opening is disposed between the first lens and the second lens, the opening of the spacer having a noncircular shape when viewed in the optical axis direction, a total focal length f of a lens unit including the first lens through the fifth lens and half (IMG HT) of a diagonal length of an imaging surface of an image sensor satisfy f/IMG HT>4.9, and an effective aperture radius ER11 of an object-side surface of the first lens, and a maximum value ER_max of an effective aperture radius of an object-side surface and an effective aperture radius of an image-side surface of each of the third lens, the fourth lens, and the fifth lens satisfy ER11/ER_max>1.1.

The optical imaging system may satisfy ER21/ER_max>1.0, where ER21 is an effective aperture radius of an object-side surface of the second lens.

The spacer may have an inner circumferential surface defining the opening, the inner circumferential surface may include a first inner side surface and a second inner side surface having an arc shape, and a third inner side surface and a fourth inner side surface connecting the first inner side surface and the second inner side surface to each other, and the third inner side surface and the fourth inner side surface may each include at least one concave curved surface and at least one convex curved surface.

The at least one concave curved surface and the at least one convex curved surface may be alternated along the third inner side surface and the fourth inner side surface.

In another general aspect, an optical imaging system includes at least four lenses and no more than five lenses arranged sequentially along an optical axis of the optical imaging system. A lens disposed closest to an object side along the optical axis has a positive refractive power, a lens disposed closest to an image side along the optical axis has a positive refractive power, a focal length of the lens disposed closest to the object side is less than half of a total focal length of a lens unit including all of the lenses, and the focal length of the lens disposed closest to the object side is greater than an absolute value of a focal length of a lens disposed adjacent to the lens disposed closest to the object side.

The optical imaging system may consist of four lenses.

The optical imaging system may consist of five lenses.

The lens disposed closest to the object side and the lens disposed closest to the image side may include a first plastic material, and the other lenses may each include one or more plastic materials having optical properties that are different from optical properties of the first plastic material.

One or both of the lens disposed closest to the object side and a lens disposed adjacent to the lens disposed closest to the object side may be noncircular lenses.

An effective aperture radius of the one or both lenses that are noncircular lenses may be greater than an effective aperture radius of each of the other lenses.

The lens disposed closest to the object side may include a convex object-side surface and a convex image-side surface.

The lens disposed closest to the image side may include a convex object-side surface and a concave image-side surface.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
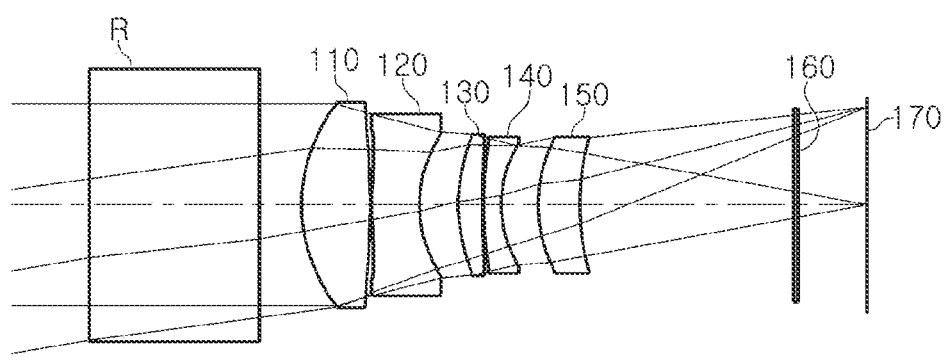
FIG. 1 is a lens configuration diagram of an optical imaging system according to a first example.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

The drawings may not be to scale, and the relative size, proportions, and depiction of elements in the drawings may be exaggerated for clarity, illustration, and convenience.

Subsequently, examples are described in further detail with reference to the accompanying drawings.

In addition, throughout the specification, 'including' indicates that other elements may be included, rather than excluding other elements, unless specifically stated otherwise.

In the following lens configuration diagrams, the thickness, size, and shape of lenses may be illustrated in a somewhat exaggerated manner for explanatory purposes, and in detail, the shape of a spherical or aspherical surface presented in the lens configuration diagram is illustrated by way of example only and is not limited thereto.

An optical imaging system according to an example may include a plurality of lenses disposed along an optical axis. The plurality of lenses may be spaced from each other by a predetermined distance along the optical axis.

As an example, the optical imaging system includes five or four lenses.

In an example in which five lenses are provided in the optical imaging system, a first lens refers to a lens closest to an object side (or a reflecting member), and a fifth lens refers to a lens closest to an image sensor.

In an example in which four lenses are provided in the optical imaging system, a first lens refers to a lens closest to an object side (or a reflecting member), and a fourth lens refers to a lens closest to an image sensor.

In each lens, a first surface refers to a surface (or an object-side surface) adjacent to the object, and a second surface refers to a surface (or an image-side surface) adjacent to an imaging plane. In the present specification, the numerical values with respect to a radius of curvature of a lens, a thickness, and the like of the lens are all in mm, and the unit of an angle is degrees.

In addition, in the description of the shape of each lens, a convex shape of one surface indicates that a paraxial region of the surface is convex, and a concave shape of one surface indicates that a paraxial region of the surface is concave. Therefore, even in the case in which one surface of the lens is described as having a convex shape, an edge portion of the lens may be concave. Similarly, even in a case in which one surface of the lens is described as having a concave shape, the edge portion of the lens may be convex.

The paraxial region refers to a relatively narrow region near an optical axis.

An optical imaging system according to an example includes five lenses.

For example, an optical imaging system according to an example includes a first lens, a second lens, a third lens, a fourth lens, and a fifth lens arranged in order from an object side.

An optical imaging system according to another example includes four lenses.

For example, an optical imaging system according to the example includes a first lens, a second lens, a third lens and a fourth lens arranged in order from an object side.

However, lenses of the optical imaging system in the present disclosure are not limited to five or four lenses. For example, the optical imaging system may further include other components.

For example, the optical imaging system may further include a reflecting member having a reflective surface for changing an optical path. The reflecting member is configured to change the path of light by 90 degrees. In an example, the reflecting member may be a mirror or a prism.

The reflecting member is disposed closer to the object than the plurality of lenses. Thus, in this specification, a lens closest to an object side may be a lens closest to the reflecting member.

Further, the optical imaging system may further include an image sensor for converting an image of an incident subject into an electric signal.

The optical imaging system may further include an infrared cutoff filter (hereinafter, referred to as a filter) for blocking infrared rays. The filter is disposed between the image sensor and a lens (a fifth lens or a fourth lens) disposed closest to the image sensor.

All the lenses constituting the optical imaging system according to the example may be formed of a plastic material.

Among the plurality of lenses constituting the optical imaging system, a lens closest to the reflecting member and a lens closest to the image sensor are formed of a first plastic material, and the other lenses are formed of a plastic material having optical properties, different from the first plastic material.

In an example, in the case of an optical imaging system composed of five lenses, a first lens is formed of a first plastic material, and a second lens and a fourth lens are formed of a second plastic material having optical characteristics different from those of the first plastic material, and a third lens and a fifth lens may be formed of plastic materials different from the first and second plastic materials and having optical characteristics different from each other.

In the case of an optical imaging system composed of four lenses, a first lens to a fourth lens may all be formed of plastic materials having different optical characteristics.

On the other hand, at least a portion of the lenses of the optical imaging system has a noncircular planar shape. For example, at least one of the first lens and the second lens may be formed to have a noncircular shape, and the remaining lenses may be formed to have a circular shape. Alternatively, all the lenses of the optical imaging system may be formed to have a noncircular shape.

'Noncircular' indicates that the lens is not circular in a region other than a gate portion of a plastic injection lens.

A noncircular lens has four side surfaces, and two side surfaces thereof are formed to oppose each other, respectively. Further, the side surfaces opposing each other have corresponding shapes.

Figure 20:
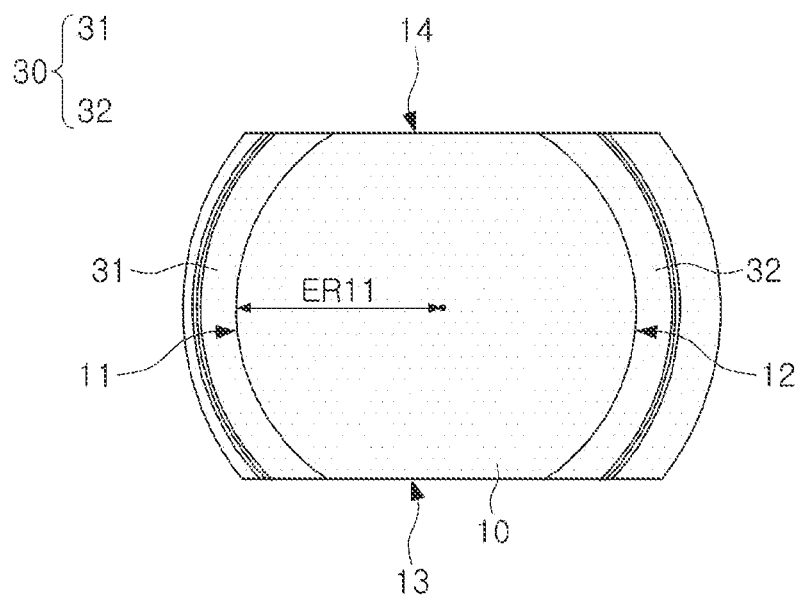
FIG. 20 is a schematic plan view of a noncircular lens of an optical imaging system according to an example.

For example, when viewed in an optical axis direction, a first side surface and a second side surface of the first lens have an arc shape, and a third side surface and a fourth side surface have a substantially linear shape (see FIG. 20). A gate, a movement path of a resin material, may be formed on either the first side surface or the second side surface.

The term 'circular' refers to meaning including a shape in which a gate portion of a plastic injection lens is cut to have a partial-cut shape.

Therefore, a circular lens may have a shape in which a portion of a circle is cut by cutting a gate, which is a path for movement of a resin material.

Figure 19:
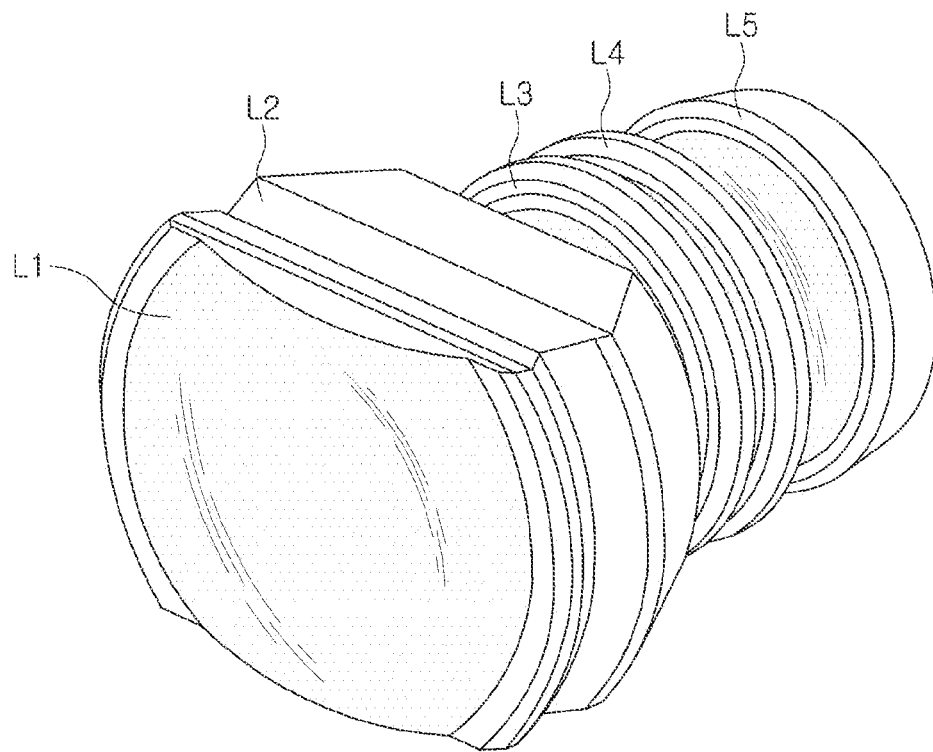
FIG. 19 is a schematic perspective view of an optical imaging system according to an example.

All the lenses of the optical imaging system include an optical portion and a flange portion. Hereinafter, a lens which is noncircular will be described in detail with reference to FIGS. 19 and 20.

In this example, a lens, which has a noncircular shape, is provided as a first lens L1 and a second lens L2. For convenience of description, the same or overlapping description of the second lens L2 will be omitted, and mainly the first lens L1 will be described.

An optical portion 10 may be a portion in which optical performance of the first lens L1 is exerted. In an example, light reflected from a subject may be refracted while passing through the optical portion 10.

The optical portion 10 may have refractive power and may have an aspherical shape.

The optical portion 10 includes an object-side surface (a surface facing an object side) and an image-side surface (a surface facing an imaging plane) (the object-side surface is illustrated in FIG. 20).

The flange portion 30 may be a portion that fixes the first lens L1 to another configuration, for example, a lens barrel or the second lens L2.

The flange portion 30 extends around at least a portion of the optical portion 10 and may be formed integrally with the optical portion 10.

The optical portion 10 and the flange portion 30 are formed to have a noncircular shape. For example, the optical portion 10 and the flange portion 30 are noncircular when viewed in the optical axis direction (see FIGS. 19 and 20). Alternatively, the optical portion 10 may have a circular shape and the flange portion 30 may have a noncircular shape.

The optical portion 10 includes a first edge 11, a second edge 12, a third edge 13, and a fourth edge 12. The first edge 11 and the second edge 12 are located to oppose each other, and the third edge 13 and the fourth edge 14 are located to oppose each other.

The first and second edges 11 and 12 have an arc shape, while the third and fourth edges 13 and 14 have a substantially linear shape, viewed in the optical axis direction.

The flange portion 30 includes a first flange portion 31 and a second flange portion 32. The first flange portion 31 extends from the first edge 11 of the optical portion 10, and the second flange portion 32 extends from the second edge 12 of the optical portion 10.

The first edge 11 of the optical portion 10 may refer to a portion thereof adjacent to the first flange portion 31, and the second edge 12 of the optical portion 10 may refer to a portion thereof adjacent to the second flange portion 32.

The third edge 13 of the optical portion 10 may refer to one side surface of the optical portion 10 in which the flange portion 30 is not formed, and the fourth edge 14 of the optical portion 10 may refer to the other side surface of the optical portion 10 in which the flange portion 30 is not formed.

The first lens L1 is formed of a plastic material and injection-molded through a mold. In this case, the third edge 13 and the fourth edge 14 of the first lens L1 according to the example are not formed by cutting a portion of the lens after the injection molding, but are formed to have such a shape during the injection molding.

If a portion of the lens is removed after injection molding, the lens may be deformed by force applied to the lens during the removal. In a case in which the lens is deformed, optical performance of the lens is inevitably changed, which may be problematic.

However, in the case of the first lens L1 according to the example, since the first lens L1 is formed to have a noncircular shape when the first lens L1 is injected, the size of the first lens L1 may be reduced, while securing performance of the first lens L1.

In this example, the lenses that are noncircular, for example, the first lens L1 and the second lens L2, are disposed more adjacently to the object side than the other lenses (third lens L3, fourth lens L4, and fifth lens L5).

Further, an effective aperture radius of the lens that is noncircular is formed to be greater than an effective aperture radius of the other lenses.

The effective aperture radius refers to a radius of one surface (an object-side surface and an image-side surface) of each lens through which light actually passes. For example, the effective aperture radius refers to a radius of the optical portion of each lens.

Since the first lens L1 is noncircular, an effective aperture radius of the first lens L1 has a maximum effective aperture radius, corresponding to half of a virtual straight line connecting the first edge 11 and the second edge 12 while passing through an optical axis, and a minimum effective aperture radius, corresponding to half of a virtual straight line connecting the third edge 13 and the fourth edge 14 while passing through the optical axis. The effective aperture radius of a lens having a noncircular shape in this specification refers to the maximum effective aperture radius.

The optical imaging system includes a self-alignment structure. In an example, the optical imaging system has a structure in which optical axes are aligned by mutual coupling of at least portions of the lenses.

The first lens L1 is in contact with a lens barrel in such a manner that the optical axis is aligned, and at least one of the remaining lenses is coupled to a lens adjacent thereto to be aligned with respect to the optical axis. For example, the first lens L1 and the second lens L2 may be coupled to each other to align the optical axis. A concavo-convex structure is respectively provided on a flange portion of an image-side surface of the first lens L1 and a flange portion of an object-side surface of the second lens L2, and the concavo-convex structure of the first lens L1 and the concavo-convex structure of the second lens L2 are coupled to each other, to align the optical axis.

Each of the plurality of lenses may have at least one aspheric surface.

For example, at least one of the first surface and the second surface of each of the first lens through the fifth lens may be an aspherical surface. In this case, the aspherical surfaces of the first lens to the fifth lens are represented by the following equation 1.

$$Z = \frac{cY^2}{1 + \sqrt{1 - (1+K)c^2Y^2}} + AY^4 + BY^6 + CY^8 + DY^{10} + EY^{12} + FY^{14} + \ldots \quad \text{Equation 1}$$

In Equation 1, c is curvature of the lens (inverse of a curvature radius), K is a conic constant, and Y is a distance from an arbitrary point on an aspherical surface of the lens to an optical axis. In addition, constants A to F are aspheric coefficients. Z represents a distance from an arbitrary point on the aspheric surface of the lens to an apex of the aspheric surface.

The optical imaging system composed of the first lens to the fifth lens may have positive/negative/positive/negative/positive refractive powers in order from the object side, or may have positive/negative/positive/positive/positive refractive powers in order from the object side.

The optical imaging system composed of the first lens to the fourth lens may have positive/negative/positive/positive refractive powers in order from the object side.

The optical imaging system according to an example may satisfy at least one of the following conditional expressions.

| | |
|---|---|
| $f/IMG\ HT > 4.9$ | Conditional Expression 1 |
| $0.8 < TTL/f < 1.2$ | Conditional Expression 2 |
| $1.3 < TTL/BFL < 3.3$ | Conditional Expression 3 |
| $0.75 < f12/f < 4.5$ | Conditional Expression 4 |
| $3.8 < f/TD12 < 7$ | Conditional Expression 5 |
| $ER11/ER\_max > 1.1$ | Conditional Expression 6 |
| $ER11/ER51 > 1.1$ | Conditional Expression 7 |
| $ER21/ER\_max > 1.0$ | Conditional Expression 8 |
| $ER21/ER51 > 1.0$ | Conditional Expression 9 |
| $CRA\_max < 18$ | Conditional Expression 10 |

In the conditional expressions, IMG HT is half a diagonal length of an imaging surface of the image sensor, and TTL is a distance on an optical axis from an object-side surface of the first lens to an image surface of the image sensor.

f is a total focal length of the optical imaging system, and BFL is a distance on the optical axis from an image side surface of a lens disposed closest to the image sensor to an image surface of the image sensor.

f12 is a combined focal length of the first lens and the second lens, and TD12 is a distance on the optical axis from the object-side surface of the first lens to the image-side surface of the second lens.

ER11 is an effective aperture radius of the object-side surface of the first lens, ER21 is an effective aperture radius of the object-side surface of the second lens, and ER51 is an effective aperture radius of an object-side surface of a lens closest to the image sensor.

ER_max denotes a maximum value among effective radii of object-side surfaces and effective radii of image side surfaces of lenses other than the first lens and the second lens.

CRA_max is a maximum value of an incident angle of a principal ray on an imaging plane.

Next, a first lens to a fifth lens constituting an optical imaging system according to an example will be described.

The first lens has positive refractive power. The first lens may have a shape in which both surfaces thereof are convex. For example, the first and second surfaces of the first lens may have a convex shape.

At least one of the first surface and the second surface of the first lens may be aspherical. For example, both surfaces of the first lens may be aspheric.

The second lens has negative refractive power. The second lens may have a meniscus shape convex toward an object. For example, the first surface of the second lens may be convex in a paraxial region, and the second surface of the second lens may be concave in the paraxial region.

In the case of the second lens, at least one of the first surface and the second surface may be aspherical. For example, both surfaces of the second lens may be aspheric.

The third lens may have positive refractive power. Further, the third lens may have a meniscus shape convex toward the object. For example, the first surface of the third lens may be convex in the paraxial region, and the second surface of the third lens may be concave in the paraxial region. Alternatively, the third lens may have a meniscus shape convex toward an imaging plane. For example, the first surface of the third lens may be concave in the paraxial region, and the second surface of the third lens may be convex in the paraxial region.

In the case of the third lens, at least one of the first surface and the second surface may be aspherical. For example, both surfaces of the third lens may be aspherical.

The fourth lens has positive or negative refractive power. The fourth lens may have a meniscus shape convex toward the object. For example, the first surface of the fourth lens may be convex in the paraxial region, and the second surface of the fourth lens may be concave in the paraxial region. Alternatively, the fourth lens may have a meniscus shape convex toward an imaging plane. For example, the first surface of the fourth lens may be concave in the paraxial region, and the second surface of the fourth lens may be convex in the paraxial region.

In the case of the fourth lens, at least one of the first surface and the second surface may be aspherical. For example, both surfaces of the fourth lens may be aspherical.

The fifth lens has positive refractive power.

Further, the fifth lens may have a meniscus shape convex toward the object. For example, the first surface of the fifth lens may be convex in the paraxial region, and the second surface of the fifth lens may be concave in the paraxial region.

In the case of the fifth lens, at least one of the first surface and the second surface may be aspherical. For example, both surfaces of the fifth lens may be aspherical.

The fifth lens is a lens having no inflection point formed on the object-side surface and the image-side surface. Therefore, the fifth lens has a convex first surface and a concave second surface even in a region other than the paraxial region, as well as in the paraxial region.

Next, a first lens to a fourth lens constituting an optical imaging system according to another example will be described.

The first lens has positive refractive power. The first lens may have both surfaces with a convex shape. For example, the first and second surfaces of the first lens may be convex in a paraxial region.

At least one of the first surface and the second surface of the first lens may be aspherical. For example, both surfaces of the first lens may be aspheric.

The second lens has negative refractive power. The second lens may have a meniscus shape convex toward an object. For example, the first surface of the second lens may be convex in the paraxial region, and the second surface of the second lens may be concave in the paraxial region.

In the case of the second lens, at least one of the first surface and the second surface may be aspherical. For example, both surfaces of the second lens may be aspheric.

The third lens may have positive refractive power. Further, the third lens may have a meniscus shape convex toward an object. For example, the first surface of the third lens may be convex in the paraxial region, and the second surface of the third lens may be concave in the paraxial region.

In the case of the third lens, at least one of the first surface and the second surface may be aspherical. For example, both surfaces of the third lens may be aspherical.

The fourth lens has positive refractive power. The fourth lens may have a meniscus shape convex toward the object. For example, the first surface of the fourth lens may be convex in the paraxial region, and the second surface of the fourth lens may be concave in the paraxial region.

In the case of the fourth lens, at least one of the first surface and the second surface may be aspherical. For example, both surfaces of the fourth lens may be aspherical.

The fourth lens is a lens of which inflection point is not formed on the object-side surface and the image-side surface. Therefore, the fourth lens has a convex first surface and a concave second surface even in a region other than the paraxial region, as well as in the paraxial region.

In the optical imaging systems configured as described above, since a plurality of lenses perform an aberration correcting function, aberration improvement performance may be improved.

In addition, the optical imaging system according to an example has a telephoto ratio (TTL/f) of more than 0.8 and less than 1.2, such that telephoto lens characteristics and a narrow angle of view may be implemented.

An optical imaging system according to a first example will be described with reference to FIGS. 1 to 3.

An optical imaging system according to the first example includes an optical system including a first lens 110, a second lens 120, a third lens 130, a fourth lens 140 and a fifth lens 150, and may further include a filter 160 and an image sensor 170.

Further, the optical imaging system may further include a reflecting member R disposed closer to an object than the first lens 110 and having a reflective surface for changing an optical path. In the first example, while the reflecting member R may be a prism, the reflecting member R may also be provided as a mirror.

Table 1 illustrates lens characteristics, for example, radius of curvature, a lens thickness, a distance between lenses, refractive index, Abbe number, of each lens.

A total focal length of the optical imaging system is 15.0027 mm.

TABLE 1

| Surface No. | Remarks | Curvature Radius | Thickness or Distance | Refractive Index | Abbe Number | Effective Aperture Radius | Focal Length |
|---|---|---|---|---|---|---|---|
| | Prism | Infinity | 4.500 | 1.7174 | 29.50 | | |
| | Prism | Infinity | 1.100 | | | | |
| S1 | 1st Lens | 4.3621786 | 1.850 | 1.5315 | 55.66 | 2.720 | 6.314838 |
| S2 | | −12.93311 | 0.030 | | | 2.529 | |
| S3 | 2nd Lens | 34.873195 | 1.250 | 1.6150 | 25.96 | 2.434 | −5.09605 |
| S4 | | 2.859842 | 1.020 | | | 1.934 | |
| S5 | 3rd Lens | 4.0779478 | 0.650 | 1.6707 | 19.24 | 1.867 | 7.923147 |
| S6 | | 15.773482 | 0.030 | | | 1.832 | |
| S7 | 4th Lens | 8.2367262 | 0.450 | 1.6150 | 25.96 | 1.812 | −6.284906 |
| S8 | | 2.5915903 | 0.970 | | | 1.700 | |
| S9 | 5th Lens | 3.238378 | 1.100 | 1.5441 | 56.11 | 1.800 | 10.835083 |
| S10 | | 6.2892061 | 5.670 | | | 1.788 | |
| S11 | Filter | Infinity | 0.110 | 1.5167 | 64.17 | | |
| S12 | | Infinity | 1.848 | | | | |
| S13 | Imaging Surface | Infinity | 0.002 | | | | |

In the first example, the first lens 110 has positive refractive power, and first and second surfaces of the first lens 110 are convex in a paraxial region.

A focal length of the first lens 110 is less than half of a total focal length and is greater than an absolute value of a focal length of the second lens 120.

The second lens 120 has negative refractive power, a first surface of the second lens 120 is convex in the paraxial region, and a second surface of the second lens 120 is concave in the paraxial region.

The third lens 130 has positive refractive power, and a first surface of the third lens 130 is convex in the paraxial region and a second surface of the third lens 130 is concave in the paraxial region.

The fourth lens 140 has negative refractive power, a first surface of the fourth lens 140 is convex in the paraxial region, and a second surface of the fourth lens 140 is concave in the paraxial region.

The fifth lens 150 has positive refractive power, a first surface of the fifth lens 150 is convex in the paraxial region, and a second surface of the fifth lens 150 is concave in the paraxial region. In a region other than the paraxial region, the first surface of the fifth lens 150 is convex and the second surface of the fifth lens 150 is concave.

Respective surfaces of the first lens 110 to the fifth lens 150 have an aspherical surface coefficient as illustrated in Table 2. For example, object-side surfaces and image-side surfaces of the first lens 110 to the fifth lens 150 are all aspherical surfaces.

TABLE 2

|   | S1 | S2 | S3 | S4 | S5 |
|---|---|---|---|---|---|
| K | −0.69940346 | 0.00000000 | 0.00000000 | 0.00000000 | 0.00000000 |
| A | 0.00098243 | 0.00228031 | −0.00561997 | −0.01357625 | −0.00988319 |
| B | 0.00003611 | −0.00002062 | 0.00075107 | 0.00075230 | 0.00132122 |
| C | −0.00000224 | −0.00000190 | −0.00006178 | −0.00022469 | −0.00018361 |
| D | 0.00000110 | −0.00000181 | 0.00000262 | 0.00005148 | −0.00001354 |
| E | −0.00000013 | 0.00000015 | 0.00000005 | −0.00000524 | 0.00000825 |

|   | S6 | S7 | S8 | S9 | S10 |
|---|---|---|---|---|---|
| K | 0.00000000 | 0.00000000 | 0.00000000 | 0.00000000 | 0.00000000 |
| A | −0.01112538 | −0.00928940 | −0.02208945 | −0.01176436 | −0.00158719 |
| B | 0.00247984 | −0.00002393 | 0.00034167 | 0.00047792 | −0.00043485 |
| C | −0.00037494 | 0.00071974 | 0.00094533 | 0.00005094 | 0.00014364 |
| D | 0.00000356 | −0.00018516 | −0.00024060 | 0.00003078 | 0.00001034 |
| E | 0.00000721 | 0.00001249 | 0.00001173 | −0.00000543 | −0.00000172 |

Figure 2:
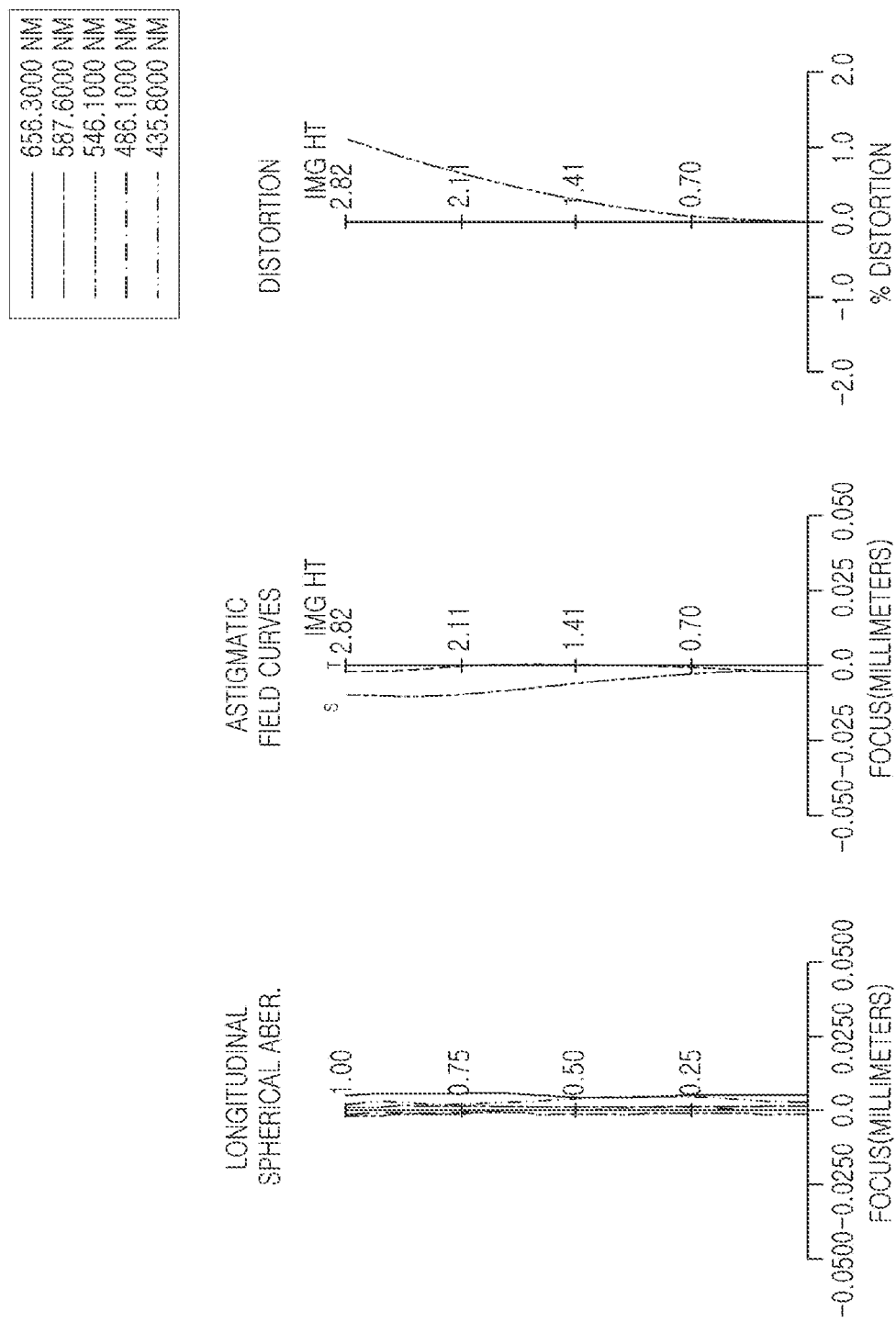
FIGS. 2 and 3 are graphs containing curves illustrating aberration characteristics of the optical imaging system illustrated in FIG. 1.
Figure 3:
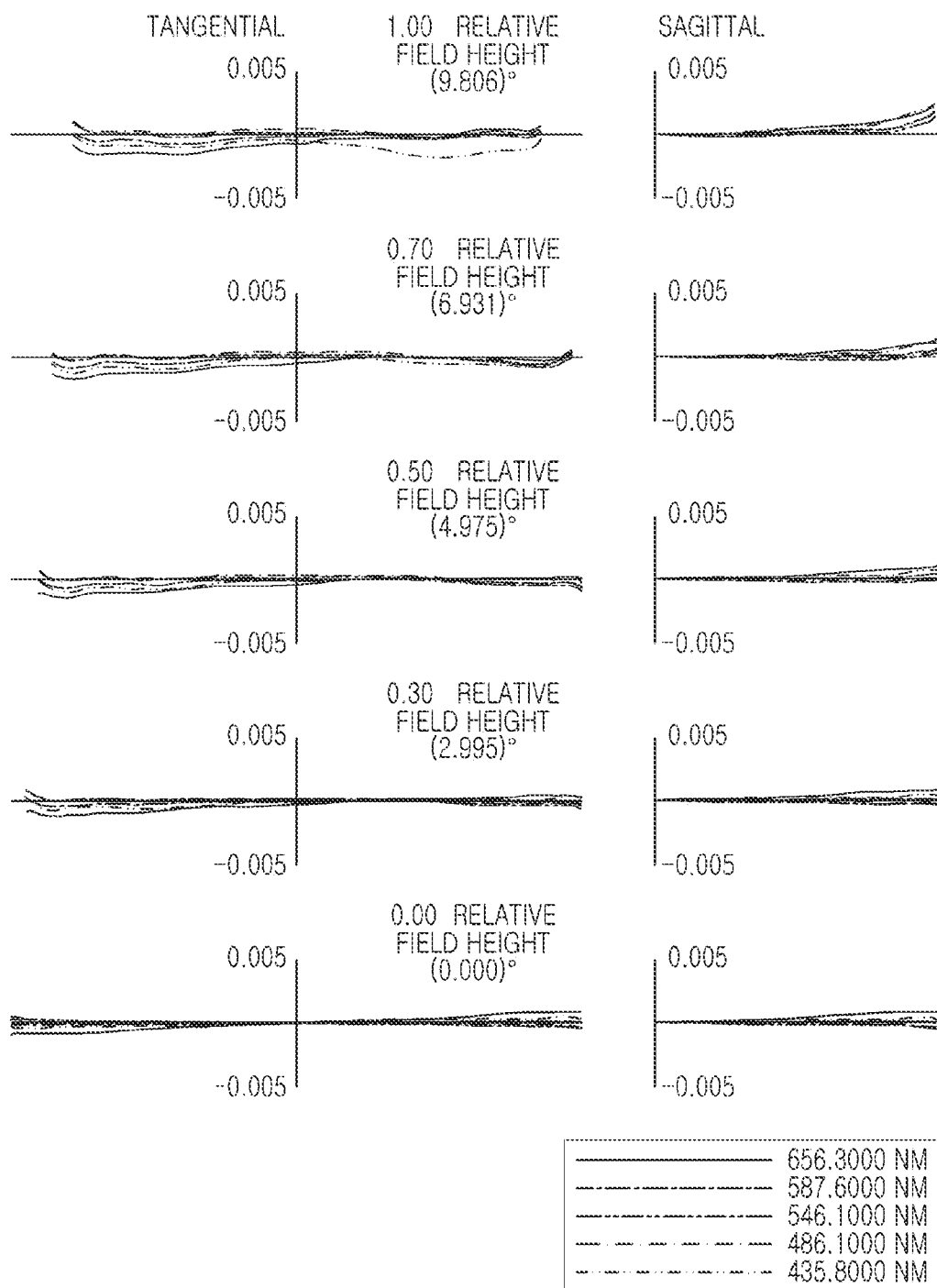

Further, the optical imaging system of FIG. 1 may have aberration characteristics illustrated in FIGS. 2 and 3.

An optical imaging system according to a second example will be described with reference to FIGS. 4 to 6.

The optical imaging system according to the second example includes an optical system having a first lens 210, a second lens 220, a third lens 230, a fourth lens 240 and a fifth lens 250, and may further include a filter 260 and an image sensor 270.

The optical imaging system may further include a reflecting member R disposed closer to an object than the first lens 210 and having a reflective surface for changing an optical path. In the second example, while the reflecting member R may be a prism, the reflecting member R may also be provided as a mirror.

Table 3 illustrates lens characteristics, for example, radius of curvature, a lens thickness or a distance between lenses, refractive index, Abbe number, of each lens.

A total focal length of the optical imaging system is 15 mm.

TABLE 3

| Surface No. | Remarks | Curvature Radius | Thickness or Distance | Refractive Index | Abbe Number | Effective Aperture Radius | Focal Length |
|---|---|---|---|---|---|---|---|
|  | Prism | Infinity | 4.500 | 1.7174 | 29.50 |  |  |
|  | Prism | Infinity | 1.100 |  |  |  |  |
| S1 | 1st Lens | 4.2592383 | 2.000 | 1.5315 | 55.66 | 2.700 | 6.111269 |
| S2 |  | −11.91603 | 0.030 |  |  | 2.473 |  |
| S3 | 2nd Lens | 15.742026 | 1.000 | 1.6150 | 25.96 | 2.360 | −4.867794 |

TABLE 3-continued

| Surface No. | Remarks | Curvature Radius | Thickness or Distance | Refractive Index | Abbe Number | Effective Aperture Radius | Focal Length |
|---|---|---|---|---|---|---|---|
| S4 | | 2.4729048 | 0.970 | | | 1.927 | |
| S5 | 3rd Lens | 4.1575729 | 0.580 | 1.6707 | 19.24 | 1.866 | 11.456635 |
| S6 | | 8.4283765 | 0.315 | | | 1.817 | |
| S7 | 4th Lens | −6.398984 | 1.200 | 1.6150 | 25.96 | 1.778 | −14.64771 |
| S8 | | −23.1652 | 0.205 | | | 1.747 | |
| S9 | 5th Lens | 2.3606603 | 0.540 | 1.5441 | 56.11 | 1.800 | 20.653109 |
| S10 | | 2.7436757 | 6.180 | | | 1.772 | |
| S11 | Filter | Infinity | 0.110 | 1.5167 | 64.17 | | |
| S12 | | Infinity | 1.847 | | | | |
| S13 | Imaging Surface | Infinity | 0.003 | | | | |

In the second example, the first lens 210 has positive refractive power, and a first surface and a second surface of the first lens 210 are convex in a paraxial region.

A focal length of the first lens 210 is less than half of a total focal length, and is greater than an absolute value of a focal length of the second lens 220.

The second lens 220 has negative refractive power, and a first surface of the second lens 220 is convex in the paraxial region and a second surface of the second lens 220 is concave in the paraxial region.

The third lens 230 has positive refractive power, a first surface of the third lens 230 has a convex shape in the paraxial region, and a second surface of the third lens 230 has a concave shape in the paraxial region.

The fourth lens 240 has negative refractive power, a first surface of the fourth lens 240 has a concave shape in the paraxial region, and a second surface of the fourth lens 240 is convex in the paraxial region.

The fifth lens 250 has positive refractive power, a first surface of the fifth lens 250 is convex in the paraxial region, and a second surface of the fifth lens 250 is concave in the paraxial region. The fifth lens 250 has a convex first surface and a concave second surface in a region other than the paraxial region.

Respective surfaces of the first lens 210 to the fifth lens 250 have an aspheric surface coefficient as illustrated in Table 4. For example, object-side surfaces and image-side surfaces of the first lens 210 to the fifth lens 250 are all aspherical surfaces.

TABLE 4

| | S1 | S2 | S3 | S4 | S5 |
|---|---|---|---|---|---|
| K | −0.65874613 | 0.00000000 | 0.00000000 | 0.00000000 | 0.00000000 |
| A | 0.00102323 | 0.00390175 | −0.01045728 | −0.02483569 | −0.01455378 |
| B | 0.00005302 | −0.00021123 | 0.00140151 | 0.00063187 | 0.00004749 |
| C | −0.00000137 | −0.00001679 | −0.00008255 | 0.00010758 | 0.00014122 |
| D | 0.00000015 | 0.00000123 | −0.00000207 | 0.00000952 | 0.00010355 |
| E | −0.00000008 | 0.00000006 | 0.00000049 | −0.00001105 | −0.00002268 |

| | S6 | S7 | S8 | S9 | S10 |
|---|---|---|---|---|---|
| K | 0.00000000 | 0.00000000 | 0.00000000 | 0.00000000 | 0.00000000 |
| A | −0.02362937 | 0.01763492 | 0.01700066 | −0.03479587 | −0.03057826 |
| B | 0.00402142 | −0.00381016 | −0.00292915 | 0.00033390 | 0.00220673 |
| C | −0.00041442 | 0.00087620 | 0.00069200 | 0.00089343 | 0.00021229 |
| D | 0.00005352 | −0.00018259 | −0.00004733 | −0.00013588 | −0.00002850 |
| E | −0.00001235 | 0.00001242 | −0.00000513 | −0.00000496 | −0.00000284 |

Figure 4:
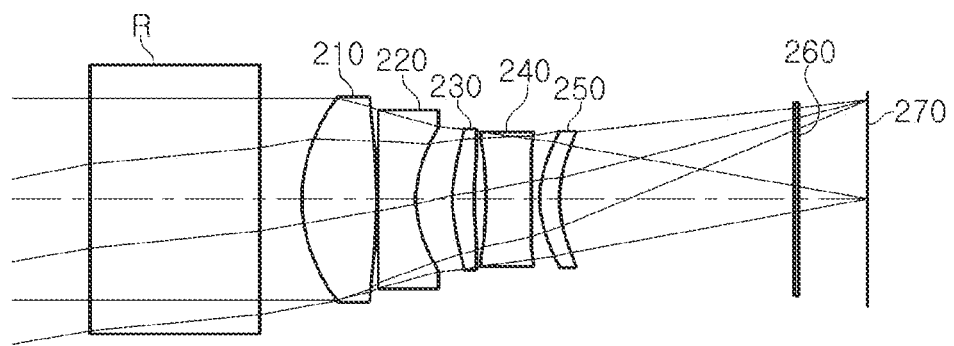
FIG. 4 is a lens configuration diagram of an optical imaging system according to a second example.
Figure 5:
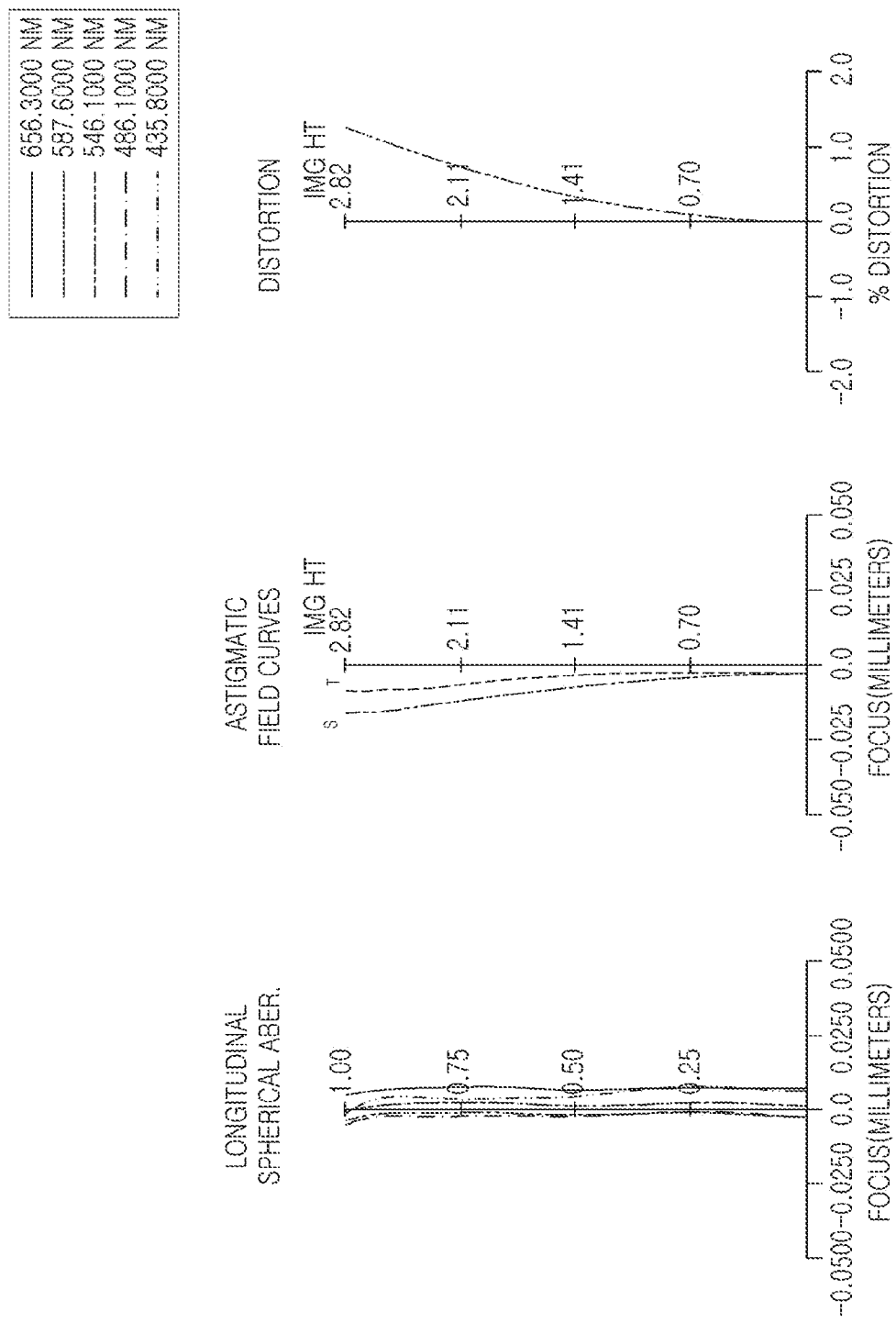
FIGS. 5 and 6 are graphs containing curves illustrating aberration characteristics of the optical imaging system illustrated in FIG. 4.
Figure 6:
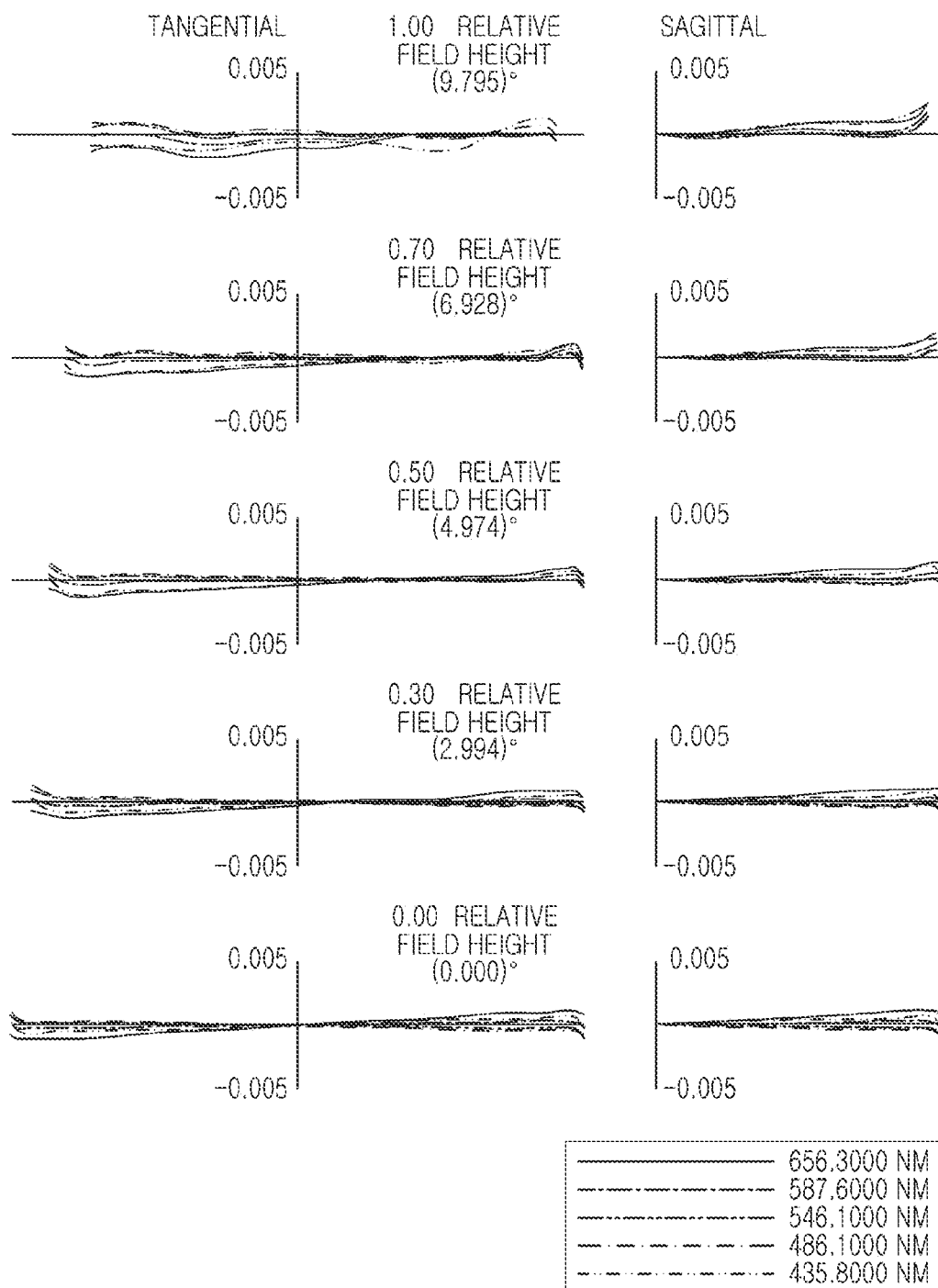

The optical imaging system of FIG. 4 may have aberration characteristics illustrated in FIGS. 5 and 6.

An optical imaging system according to a third example will be described with reference to FIGS. 7 to 9.

An optical imaging system according to the third example includes an optical system including a first lens 310, a second lens 320, a third lens 330, a fourth lens 340, and a fifth lens 350, and may further include a filter 360 and an image sensor 370.

The optical imaging system may further include a reflecting member R disposed closer to an object than the first lens 310 and having a reflective surface for changing an optical path. In the third example, while the reflecting member R may be a prism, the reflecting member R may also be provided as a mirror.

Table 5 illustrates lens characteristics, for example, a radius of curvature, a lens thickness or a distance between lenses, refractive index, Abbe number, of each lens.

A total focal length of the optical imaging system is 15 mm.

TABLE 5

| Surface No. | Remarks | Curvature Radius | Thickness or Distance | Refractive Index | Abbe Number | Effective Aperture Radius | Focal Length |
|---|---|---|---|---|---|---|---|
| | Prism | Infinity | 4.500 | 1.7174 | 29.50 | | |
| | Prism | Infinity | 1.100 | | | | |
| S1 | 1st Lens | 3.8338273 | 1.713 | 1.5315 | 55.66 | 2.700 | 5.652708 |
| S2 | | −12.25887 | 0.030 | | | 2.564 | |
| S3 | 2nd Lens | 44.04519 | 0.600 | 1.6150 | 25.96 | 2.437 | −4.504441 |
| S4 | | 2.6149102 | 0.692 | | | 2.043 | |
| S5 | 3rd Lens | 3.6156811 | 0.635 | 1.6707 | 19.24 | 2.030 | 11.731138 |
| S6 | | 6.1517404 | 1.651 | | | 1.943 | |
| S7 | 4th Lens | −4.724285 | 0.873 | 1.6150 | 25.96 | 1.954 | −25.41663 |
| S8 | | −7.221338 | 0.551 | | | 2.060 | |
| S9 | 5th Lens | 3.1264726 | 0.878 | 1.5441 | 56.11 | 2.244 | 32.665226 |
| S10 | | 3.4142292 | 0.721 | | | 2.164 | |
| S11 | Filter | Infinity | 0.210 | 1.5167 | 64.17 | | |
| S12 | | Infinity | 6.425 | | | | |
| S13 | Imaging Surface | Infinity | 0.001 | | | | |

In the third example, the first lens 310 has positive refractive power, and first and second surfaces of the first lens 310 are convex in the paraxial region.

A focal length of the first lens 310 is less than half of a total focal length, and is greater than an absolute value of a focal length of the second lens 320.

The second lens 320 has negative refractive power, a first surface of the second lens 320 is convex in the paraxial region, and a second surface of the second lens 320 is concave in the paraxial region.

The third lens 330 has positive refractive power, a first surface of the third lens 330 is convex in the paraxial region, and a second surface of the third lens 330 is concave in the paraxial region.

The fourth lens 340 has negative refractive power, a first surface of the fourth lens 340 has a concave shape in the paraxial region, and a second surface of the fourth lens 340 is convex in the paraxial region.

The fifth lens 350 has positive refractive power, a first surface of the fifth lens 350 is convex in the paraxial region, and a second surface of the fifth lens 350 is concave in the paraxial region. Further, the fifth lens 350 has a convex first surface and a concave second surface in a region other than the paraxial region.

Respective surfaces of the first lens 310 to the fifth lens 350 have an aspheric surface coefficient as illustrated in Table 6. For example, object-side surfaces and image-side surfaces of the first lens 310 to the fifth lens 350 are all aspherical surfaces.

TABLE 6

| | S1 | S2 | S3 | S4 | S5 |
|---|---|---|---|---|---|
| K | −0.84802901 | 0.00000000 | 0.00000000 | 0.00000000 | 0.00000000 |
| A | 0.00049155 | 0.00409512 | −0.00254990 | −0.01303451 | −0.00959157 |
| B | 0.00013502 | −0.00032480 | 0.00038632 | 0.00104549 | 0.00285694 |
| C | −0.00001219 | −0.00002339 | −0.00007401 | −0.00041592 | −0.00082408 |
| D | 0.00000153 | 0.00000366 | 0.00000378 | 0.00008901 | 0.00012491 |
| E | −0.00000016 | −0.00000010 | 0.00000012 | −0.00001150 | −0.00000528 |

TABLE 6-continued

|   | S6 | S7 | S8 | S9 | S10 |
|---|---|---|---|---|---|
| K | 0.00000000 | 0.00000000 | 0.00000000 | 0.00000000 | 0.00000000 |
| A | −0.00855112 | 0.01921739 | 0.00939560 | −0.02096455 | −0.01743055 |
| B | 0.00352595 | −0.00319561 | −0.00055655 | 0.00124163 | 0.00083493 |
| C | −0.00115747 | 0.00023017 | 0.00004516 | 0.00028090 | 0.00032807 |
| D | 0.00017027 | −0.00000425 | 0.00000762 | −0.00005890 | −0.00006638 |
| E | −0.00000622 | −0.00000140 | −0.00000201 | 0.00000271 | 0.00000382 |

Figure 7:
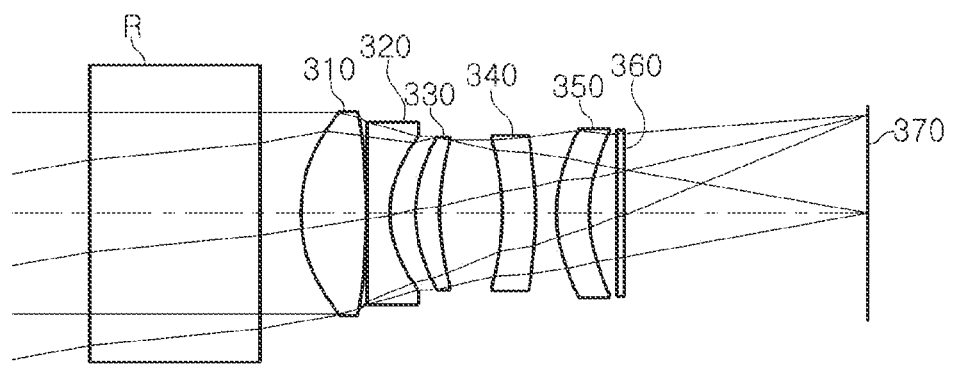
FIG. 7 is a lens configuration diagram illustrating an optical imaging system according to a third example.
Figure 8:
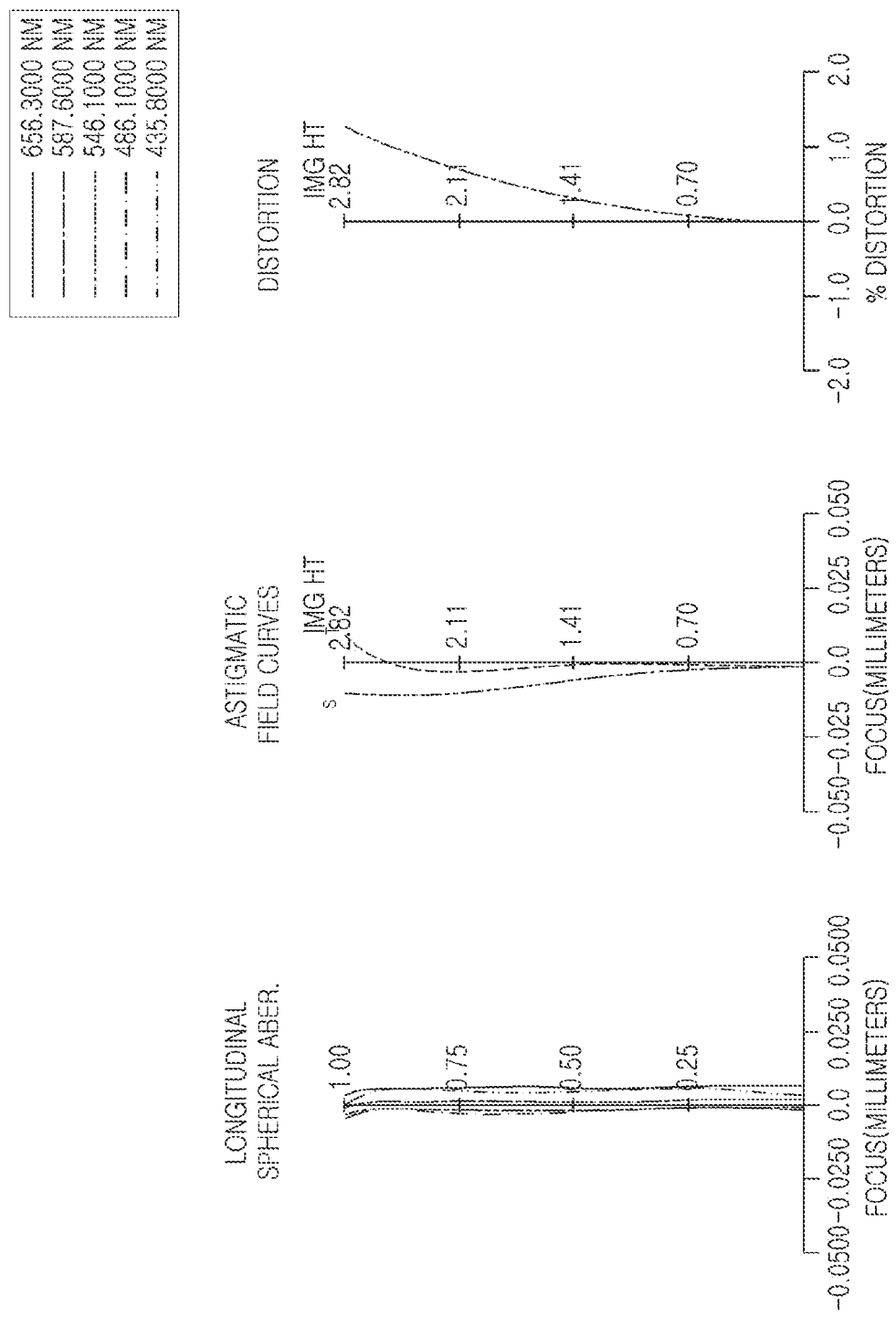
FIGS. 8 and 9 are graphs containing curves illustrating aberration characteristics of the optical imaging system illustrated in FIG. 7.
Figure 9:
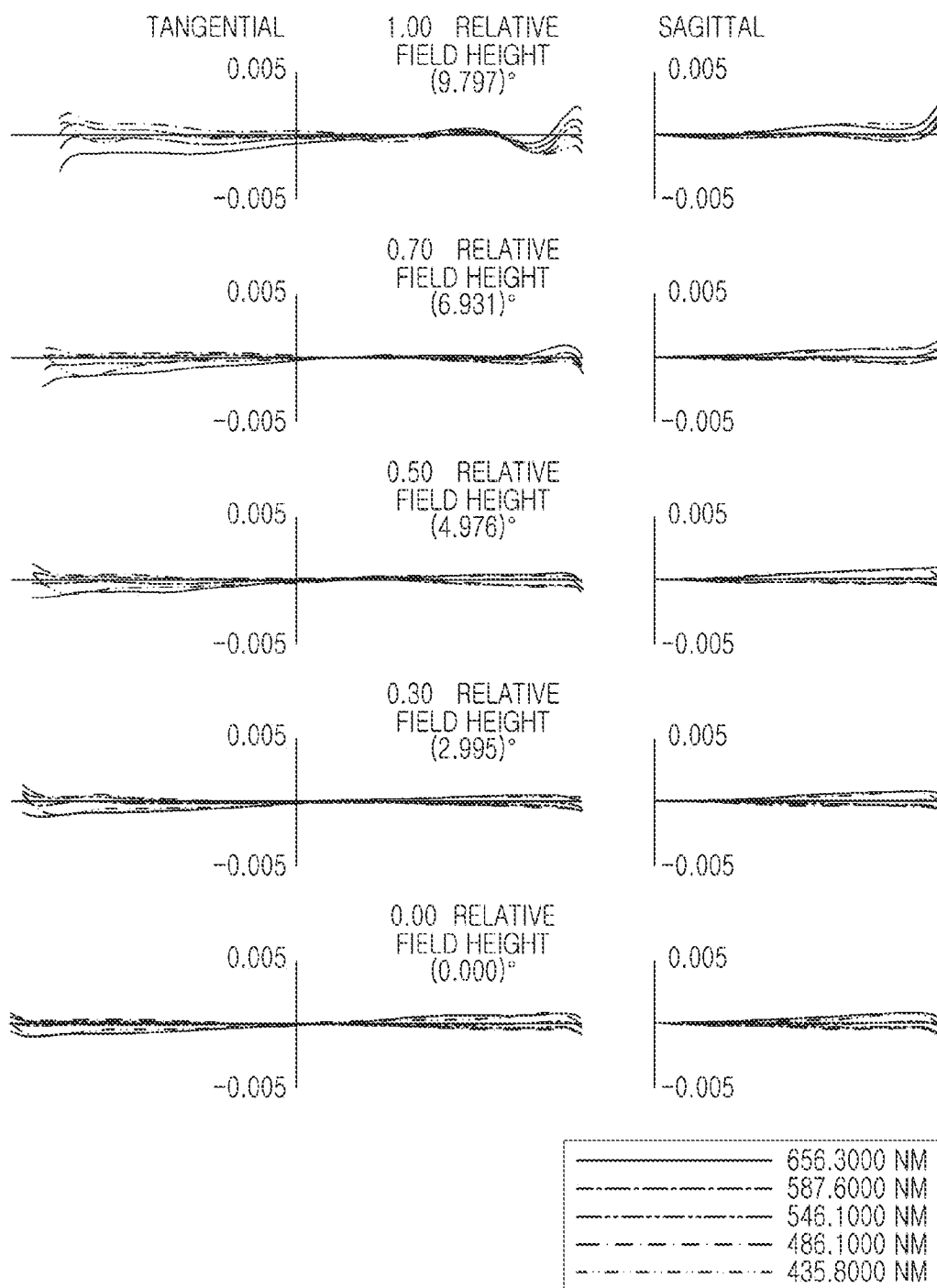

Further, the optical imaging system of FIG. 7 may have aberration characteristics illustrated in FIGS. 8 and 9.

An optical imaging system according to a fourth example will be described with reference to FIGS. 10 to 12.

An optical imaging system according to the fourth example includes an optical system including a first lens 410, a second lens 420, a third lens 430, a fourth lens 440, and a fifth lens 450, and may further include a filter 460 and an image sensor 470.

The optical imaging system may further include a reflecting member R disposed closer to an object than the first lens 410 and having a reflective surface for changing an optical path. In the fourth example, while the reflecting member R may be a prism, the reflecting member R may also be provided as a mirror.

Table 7 illustrates lens characteristics, for example, a radius of curvature, a lens thickness or a distance between lenses, refractive index, Abbe number, of each lens.

A total focal length of the optical imaging system is 15 mm.

TABLE 7

| Surface No. | Remarks | Curvature Radius | Thickness or Distance | Refractive Index | Abbe Number | Effective Aperture Radius | Focal Length |
|---|---|---|---|---|---|---|---|
|  | Prism | Infinity | 4.5 | 1.7174 | 29.50 |  |  |
|  | Prism | Infinity | 1.1 |  |  |  |  |
| S1 | 1st Lens | 4.3275887 | 1.919995918 | 1.5315 | 55.66 | 2.650 | 6.417136 |
| S2 |  | −14.24283 | 0.03 |  |  | 2.438 |  |
| S3 | 2nd Lens | 24.003293 | 1.324753314 | 1.6150 | 25.96 | 2.323 | −5.345015 |
| S4 |  | 2.8504255 | 0.304478551 |  |  | 1.806 |  |
| S5 | 3rd Lens | 4.1762363 | 0.518489229 | 1.6510 | 21.50 | 1.794 | 20.16047 |
| S6 |  | 5.7942522 | 0.780509145 |  |  | 1.703 |  |
| S7 | 4th Lens | −4.278197 | 1.014658069 | 1.6150 | 25.96 | 1.732 | 355.86708 |
| S8 |  | −4.577765 | 0.54918409 |  |  | 1.929 |  |
| S9 | 5th Lens | 4.5763314 | 0.920607 | 1.5441 | 56.11 | 2.015 | 122.96738 |
| S10 |  | 4.5618452 | 0.705268963 |  |  | 2.021 |  |
| S11 | Filter | Infinity | 0.153103832 | 1.5167 | 64.17 |  |  |
| S12 |  | Infinity | 6.776811177 |  |  |  |  |
| S13 | Imaging Surface | Infinity | 0.002141648 |  |  |  |  |

In the fourth example, the first lens 410 has positive refractive power, and a first surface and a second surface of the first lens 410 are convex in the paraxial region.

A focal length of the first lens 410 is less than half of a total focal length, and is greater than an absolute value of a focal length of the second lens 420.

The second lens 420 has negative refractive power, a first surface of the second lens 420 is convex in the paraxial region, and a second surface of the second lens 420 is concave in the paraxial region.

The third lens 430 has positive refractive power, a first surface of the third lens 430 is convex in the paraxial region, and a second surface of the third lens 430 is concave in the paraxial region.

The fourth lens 440 has positive refractive power, a first surface of the fourth lens 440 is concave in the paraxial region, and a second surface of the fourth lens 440 is convex in the paraxial region.

The fifth lens 450 has positive refractive power, a first surface of the fifth lens 450 is convex in the paraxial region, and a second surface of the fifth lens 450 is concave in the paraxial region. The fifth lens 450 has a convex first surface and a concave second surface in a region other than the paraxial region.

Respective surfaces of the first lens 410 to the fifth lens 450 have an aspheric surface coefficient as illustrated in Table 8. For example, object-side surfaces and image-side surfaces of the first lens 410 to the fifth lens 450 are all aspherical surfaces.

TABLE 8

|   | S1 | S2 | S3 | S4 | S5 |
|---|---|---|---|---|---|
| K | −0.70137171 | 0.00000000 | 0.00000000 | 0.00000000 | 0.00000000 |
| A | 0.00099425 | 0.00144742 | −0.00361412 | −0.00576326 | −0.00061021 |
| B | 0.00000991 | 0.00000111 | 0.00026288 | 0.00010513 | 0.00252501 |
| C | 0.00000807 | −0.00001645 | −0.00002419 | −0.00025228 | −0.00098208 |
| D | −0.00000086 | 0.00000161 | 0.00000362 | 0.00001546 | 0.00009614 |
| E | 0.00000001 | −0.00000003 | −0.00000013 | 0.00000319 | 0.00000325 |

|   | S6 | S7 | S8 | S9 | S10 |
|---|---|---|---|---|---|
| K | 0.00000000 | 0.00000000 | −1.98086445 | 0.00000000 | 0.00000000 |
| A | −0.00141257 | 0.01071713 | 0.00047843 | −0.01467572 | −0.01218616 |
| B | 0.00435104 | −0.00012423 | −0.00033396 | 0.00025391 | 0.00023194 |
| C | −0.00153789 | −0.00075069 | −0.00024668 | −0.00002615 | 0.00003185 |
| D | 0.00021735 | 0.00017268 | 0.00006244 | 0.00001984 | 0.00000099 |
| E | −0.00000601 | −0.00001289 | −0.00000472 | −0.00000115 | 0.00000003 |

Figure 10:
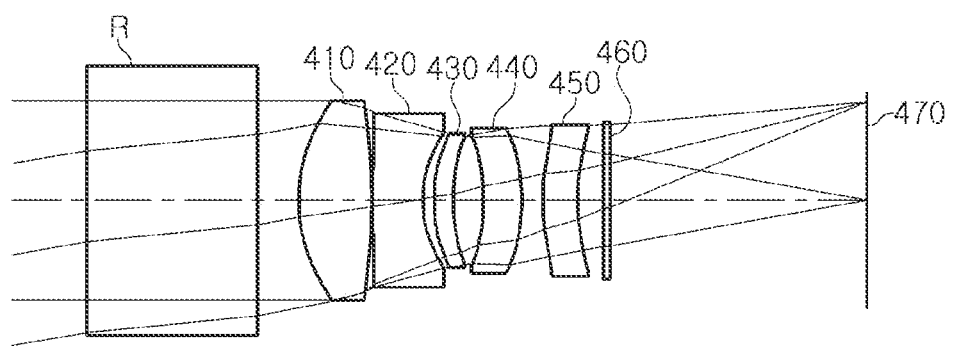
FIG. 10 is a lens configuration diagram illustrating an optical imaging system according to a fourth example.
Figure 11:
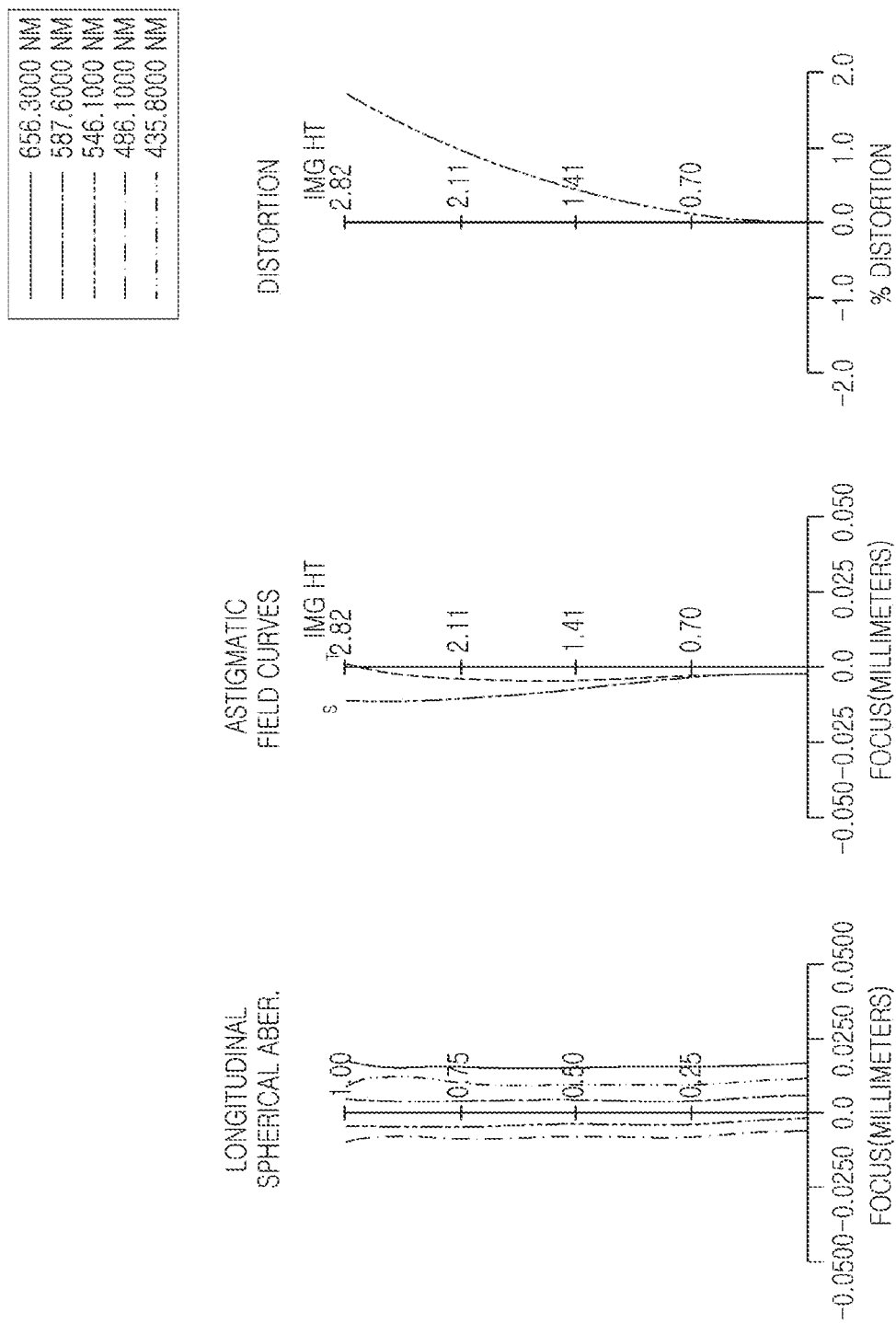
FIGS. 11 and 12 are graphs containing curves illustrating aberration characteristics of the optical imaging system illustrated in FIG. 10.
Figure 12:
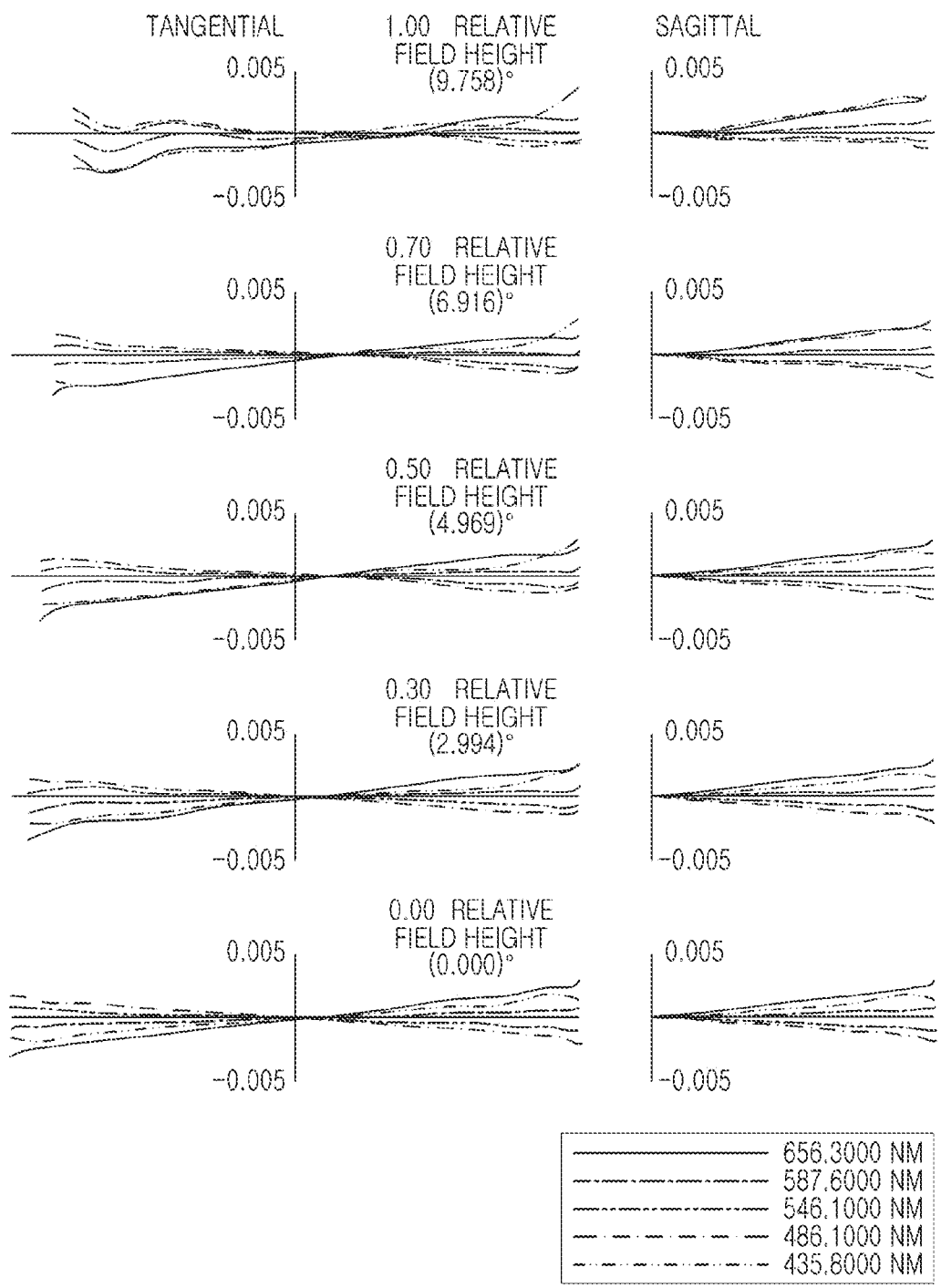

Further, the optical imaging system of FIG. 10 may have aberration characteristics illustrated in FIGS. 11 and 12.

An optical imaging system according to a fifth example will be described with reference to FIGS. 13 to 15.

The optical imaging system according to the fifth example includes an optical system having a first lens 510, a second lens 520, a third lens 530, a fourth lens 540 and a fifth lens 550, and may further include a filter 560 and an image sensor 570.

The optical imaging system may further include a reflecting member R disposed closer to an object than the first lens 510 and having a reflective surface for changing an optical path. In the fifth example, while the reflecting member R may be a prism, the reflecting member R may also be provided as a mirror.

Table 9 illustrates lens characteristics, for example, a radius of curvature, a lens thickness or a distance between lenses, refractive index, Abbe number, of each lens.

The total focal length f of the optical imaging system is 14.9712 mm.

TABLE 9

| Surface No. | Remarks | Curvature Radius | Thickness or Distance | Refractive Index | Abbe Number | Effective Aperture Radius | Focal Length |
|---|---|---|---|---|---|---|---|
|  | Prism | Infinity | 4.5 | 1.7174 | 29.50 |  |  |
|  | Prism | Infinity | 1.1 |  |  |  |  |
| S1 | 1st Lens | 4.6708423 | 1.89846332 | 1.5315 | 55.66 | 2.653 | 7.321103 |
| S2 |  | −21.20963 | 0.212169417 |  |  | 2.417 |  |
| S3 | 2nd Lens | 23.99194 | 1.447475429 | 1.6150 | 25.96 | 2.261 | −6.476088 |
| S4 |  | 3.3601753 | 0.741853806 |  |  | 1.809 |  |
| S5 | 3rd Lens | −9.931184 | 0.59547026 | 1.6392 | 23.52 | 1.807 | 13.992913 |
| S6 |  | −4.841635 | 0.261488293 |  |  | 1.802 |  |
| S7 | 4th Lens | −3.222737 | 0.671314943 | 1.6150 | 25.96 | 1.810 | −18.16407 |
| S8 |  | −4.874588 | 0.114264479 |  |  | 1.962 |  |
| S9 | 5th Lens | 3.5284184 | 1.341138278 | 1.5441 | 56.11 | 2.050 | 26.366731 |
| S10 |  | 4.0767714 | 1 |  |  | 1.972 |  |
| S11 | Filter | Infinity | 0.21 | 1.5167 | 64.17 |  |  |
| S12 |  | Infinity | 7.003334369 |  |  |  |  |
| S13 | Imaging Surface | Infinity | 0.002867186 |  |  |  |  |

In the fifth example, the first lens 510 has positive refractive power, and a first surface and a second surface of the first lens 510 are convex in the paraxial region.

A focal length of the first lens 510 is less than half of a total focal length, and is greater than an absolute value of a focal length of the second lens 520.

The second lens 520 has negative refractive power, a first surface of the second lens 520 is convex in the paraxial region, and a second surface of the second lens 520 is concave in the paraxial region.

The third lens 530 has positive refractive power, and a first surface of the third lens 530 is concave in the paraxial region and a second surface of the third lens 530 is convex in the paraxial region.

The fourth lens 540 has negative refractive power, a first surface of the fourth lens 540 is concave in the paraxial region, and a second surface of the fourth lens 540 is convex in the paraxial region.

The fifth lens 550 has positive refractive power, a first surface of the fifth lens 550 is convex in the paraxial region, and a second surface of the fifth lens 550 is concave in the paraxial region. The fifth lens 550 has a convex first surface and a concave second surface in a region other than the paraxial region.

Respective surfaces of the first lens 510 to the fifth lens 550 have an aspheric surface coefficient as illustrated in Table 10. For example, both object side surfaces and image side surfaces of the first lens 510 to the fifth lens 550 are all aspherical surfaces.

TABLE 10

|   | S1 | S2 | S3 | S4 | S5 |
|---|---|---|---|---|---|
| K | −0.59707661 | 0.00000000 | 0.00000000 | 0.00000000 | 0.00000000 |
| A | 0.00086594 | 0.00123613 | −0.00425300 | −0.00559248 | 0.00873119 |
| B | 0.00002209 | −0.00013526 | 0.00008918 | −0.00004613 | −0.00225383 |
| C | 0.00000182 | −0.00000604 | 0.00000097 | 0.00010802 | 0.00055094 |
| D | −0.00000048 | 0.00000108 | 0.00000134 | −0.00000954 | −0.00007255 |
| E |  |  |  |  |  |

|   | S6 | S7 | S8 | S9 | S10 |
|---|---|---|---|---|---|
| K | 0.00000000 | 0.00000000 | −2.62067569 | 0.00000000 | 0.00000000 |
| A | 0.00081187 | 0.00781721 | 0.00221061 | −0.00870129 | −0.00311062 |
| B | −0.00002159 | 0.00240840 | 0.00026360 | −0.00064519 | −0.00074027 |
| C | 0.00057616 | −0.00048394 | −0.00038910 | 0.00004601 | 0.00001898 |
| D | −0.00020034 | −0.00005351 | 0.00005629 | −0.00000207 | 0.00000729 |
| E | 0.00001563 | 0.00001289 | −0.00000200 | 0.00000077 | −0.00000007 |

Figure 13:
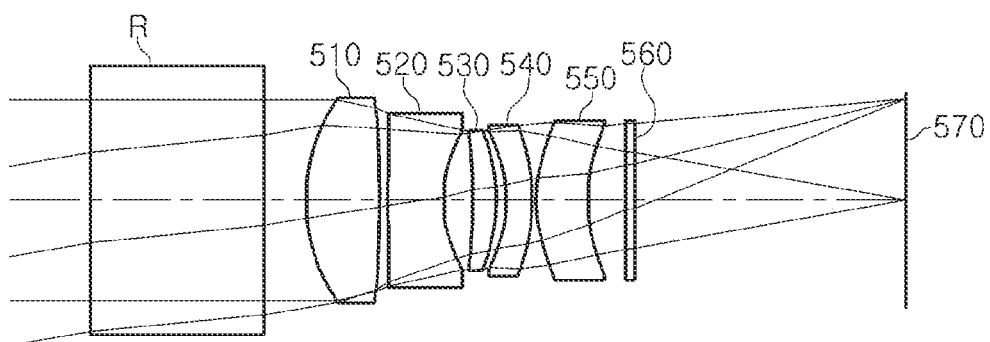
FIG. 13 is a lens configuration diagram illustrating an optical imaging system according to a fifth example.
Figure 14:
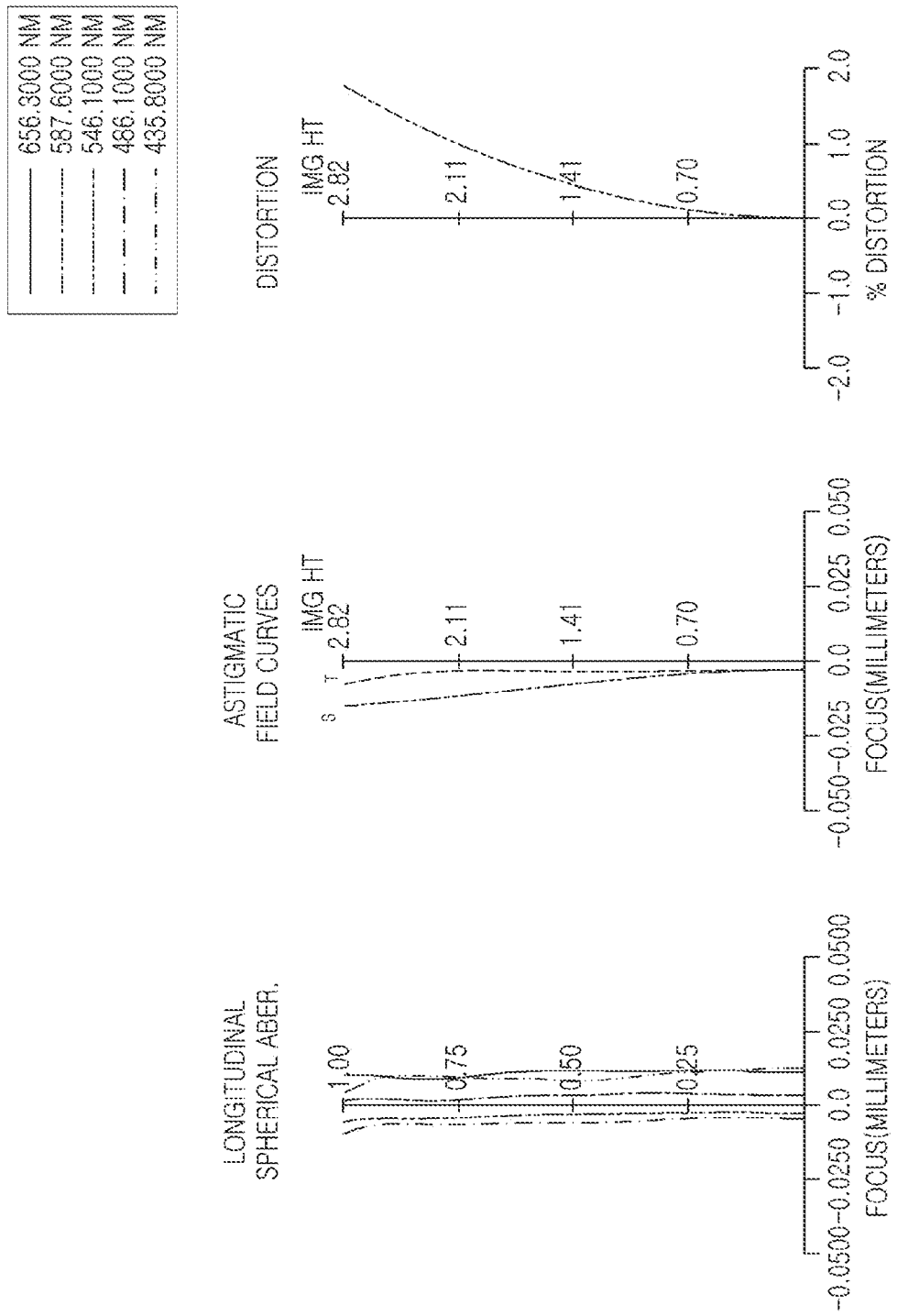
FIGS. 14 and 15 are graphs containing curves illustrating aberration characteristics of the optical imaging system illustrated in FIG. 13.
Figure 15:
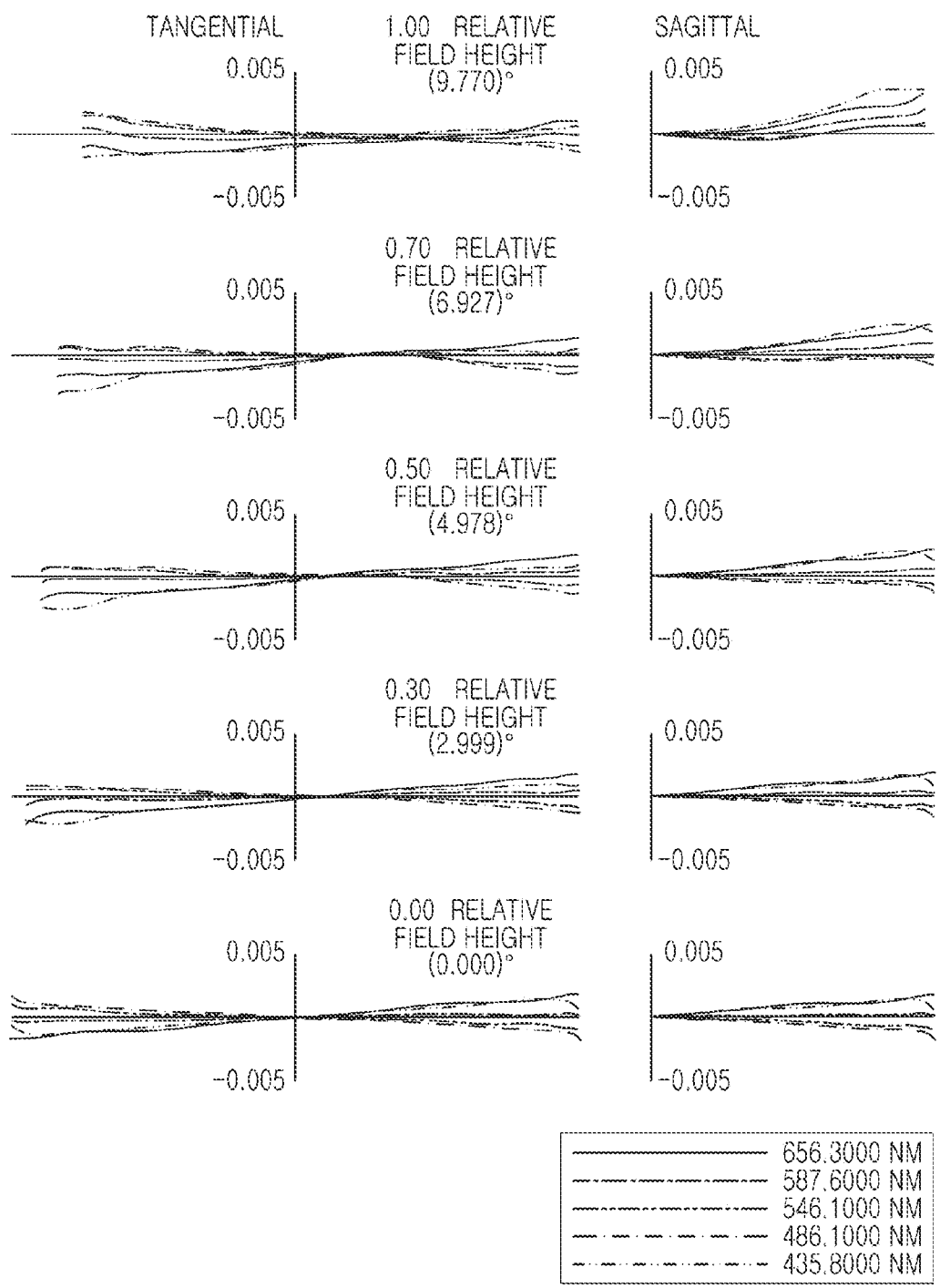

The optical imaging system of FIG. 13 may have aberration characteristics illustrated in FIGS. 14 and 15.

An optical imaging system according to a sixth example will be described with reference to FIGS. 16 to 18.

The optical imaging system according to the sixth example includes an optical system including a first lens 610, a second lens 620, a third lens 630 and a fourth lens 640, and may further include a filter 660 and an image sensor 670.

The optical imaging system may further include a reflecting member R disposed closer to an object than the first lens 610 and having a reflective surface for changing an optical path. In the sixth example, while the reflecting member R may be a prism, the reflecting member R may also be provided as a mirror.

Table 11 illustrates lens characteristics, for example, a radius of curvature, a lens thickness or a distance between lenses, refractive index, Abbe number, of each lens.

A total focal length f of the optical imaging system is 15 mm.

TABLE 11

| Surface No. | Remarks | Curvature Radius | Thickness or Distance | Refractive Index | Abbe Number | Effective Aperture Radius | Focal Length |
|---|---|---|---|---|---|---|---|
|  | Prism | Infinity | 4.5 | 1.7174 | 29.50 |  |  |
|  | Prism | Infinity | 1.1 |  |  |  |  |
| S1 | 1st Lens | 4.7425281 | 1.865240228 | 1.5315 | 55.66 | 2.700 | 7.160411 |
| S2 |  | −17.46088 | 0.03 |  |  | 2.489 |  |

TABLE 11-continued

| Surface No. | Remarks | Curvature Radius | Thickness or Distance | Refractive Index | Abbe Number | Effective Aperture Radius | Focal Length |
|---|---|---|---|---|---|---|---|
| S3 | 2nd Lens | 18.579566 | 1.675941333 | 1.6150 | 25.96 | 2.408 | −5.761223 |
| S4 | | 2.8925862 | 1.160432131 | | | 1.879 | |
| S5 | 3rd Lens | 11.285324 | 1.286221513 | 1.6612 | 20.35 | 1.932 | 25.5156 |
| S6 | | 31.808953 | 0.43169928 | | | 1.817 | |
| S7 | 4th Lens | 2.3471333 | 0.479044396 | 1.5441 | 56.11 | 1.800 | 38.024879 |
| S8 | | 2.4551549 | 1.358471605 | | | 1.804 | |
| S9 | Filter | Infinity | 0.154436541 | 1.5167 | 64.17 | | |
| S10 | | Infinity | 6.555221808 | | | | |
| S11 | Imaging Surface | Infinity | 0.002246954 | | | | |

In the sixth example, the first lens 610 has positive refractive power, and first and second surfaces of the first lens 610 have a convex shape in the paraxial region.

A focal length of the first lens 610 is less than half of the total focal length, and is greater than an absolute value of a focal length of the second lens 620.

The second lens 620 has negative refractive power, a first surface of the second lens 620 is convex in the paraxial region, and a second surface of the second lens 620 is concave in the paraxial region.

The third lens 630 has positive refractive power, a first surface of the third lens 630 is convex in the paraxial region, and a second surface of the third lens 630 is concave in the paraxial region.

The fourth lens 640 has positive refractive power, a first surface of the fourth lens 640 is convex in the paraxial region, and a second surface of the fourth lens 640 is concave in the paraxial region. The fourth lens 640 has a convex first surface and a concave second surface in a region other than the paraxial region.

Respective surfaces of the first lens 610 to the fourth lens 640 have an aspherical surface coefficient as illustrated in Table 12. For example, object side surfaces and image side surfaces of the first lens 610 to the fourth lens 640 are all aspherical surfaces.

TABLE 12

| | S1 | S2 | S3 | S4 |
|---|---|---|---|---|
| K | 0.63500325 | 0.00000000 | 0.00000000 | 0.00000000 |
| A | −0.00027471 | 0.00232210 | −0.00574578 | −0.01371633 |
| B | −0.00004013 | −0.00042967 | 0.00007894 | −0.00005175 |
| C | −0.00001237 | 0.00013525 | 0.00015332 | 0.00012945 |
| D | 0.00000215 | −0.00002076 | −0.00002635 | −0.00001672 |
| E | −0.00000023 | 0.00000108 | 0.00000153 | 0.00000048 |
| F | | | | |

| | S5 | S6 | S7 | S8 |
|---|---|---|---|---|
| K | 0.00000000 | 0.00000000 | 0.00000000 | 0.00000000 |
| A | 0.01194871 | 0.00841312 | −0.02947986 | −0.02921232 |
| B | −0.00248187 | −0.00114395 | −0.00123139 | −0.00059447 |
| C | 0.00051068 | 0.00037319 | −0.00008971 | −0.00036584 |
| D | −0.00006074 | −0.00006301 | −0.00005399 | 0.00008070 |
| E | 0.00000344 | 0.00000411 | 0.00001221 | −0.00001270 |
| F | | | −0.00000235 | 0.00000024 |

Figure 16:
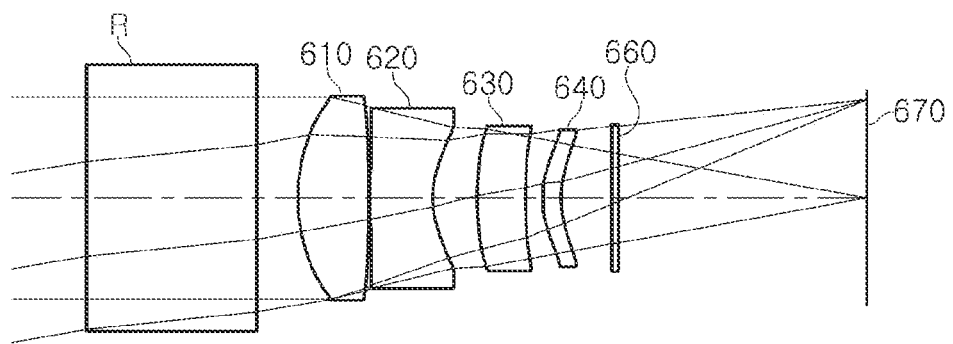
FIG. 16 is a lens configuration diagram illustrating an optical imaging system according to a sixth example.
Figure 17:
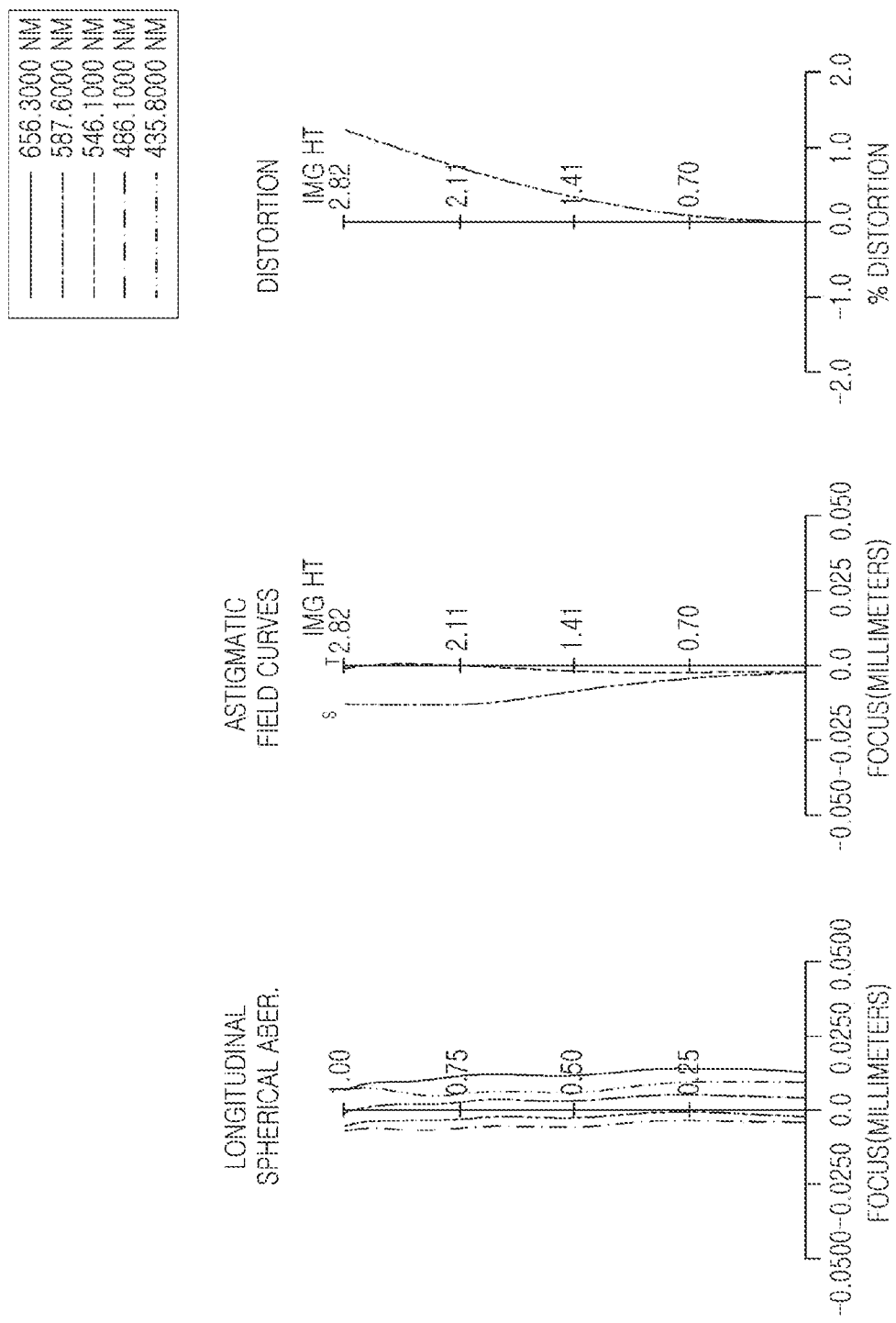
FIGS. 17 and 18 are graphs containing curves illustrating aberration characteristics of the optical imaging system illustrated in FIG. 16.
Figure 18:
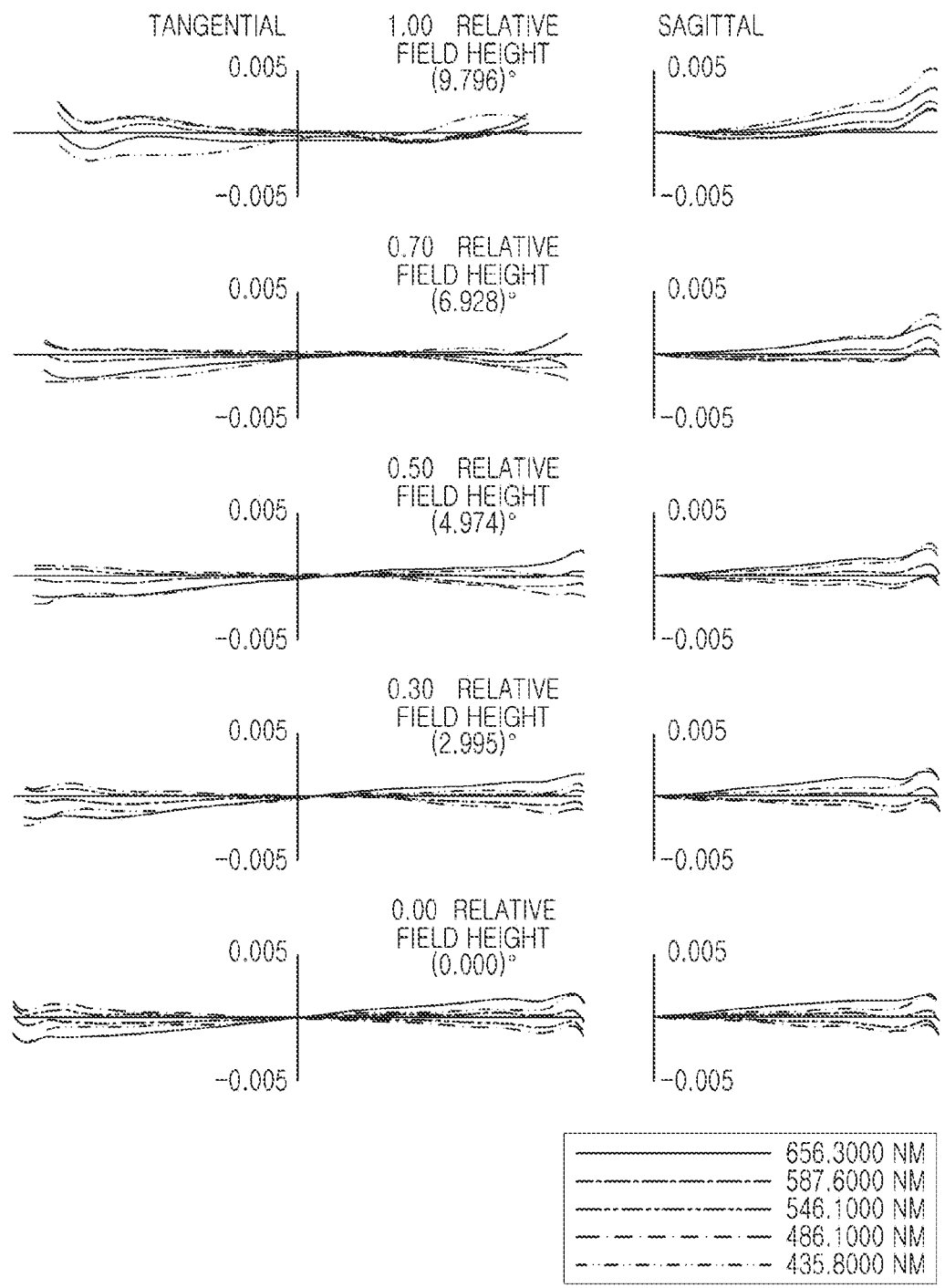

The optical imaging system of FIG. 16 may have aberration characteristics illustrated in FIGS. 17 and 18.

Figure 21:
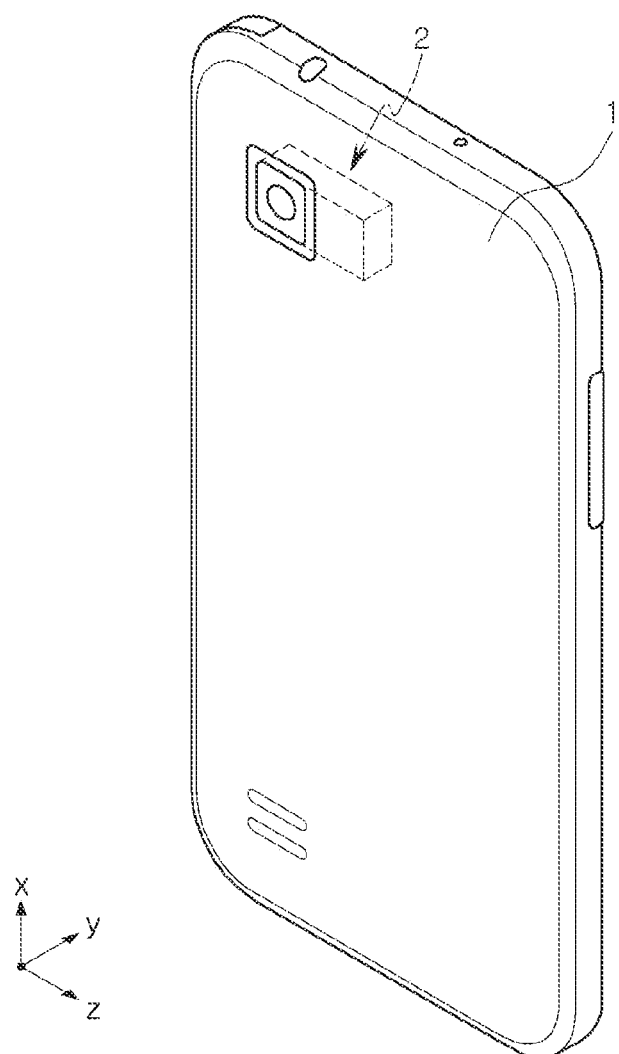
FIG. 21 is a perspective view of a portable electronic device according to an example.

FIG. 21 is a perspective view of a portable electronic device according to an example.

Referring to FIG. 21, a portable electronic device 1 according to an example may be a portable electronic device, such as a mobile communication terminal, a smartphone, or a tablet PC, to which a camera module 2 is attached.

As illustrated in FIG. 21, the portable electronic device 1 is equipped with the camera module 2 such that a subject may be imaged. The camera module 2 includes an optical imaging system, such as the optical imaging system 1000 shown in FIG. 22.

The optical imaging system 1000 includes a plurality of lenses and spacers.

In this example, the camera module 2 is disposed in such a manner that an optical axis (a z-axis) of a plurality of lenses is perpendicular to a thickness direction of the portable electronic device 1 (a y-axis direction, a direction from the front surface of the portable electronic device 1 to the rear surface thereof or in the opposite direction).

As an example, the optical axis (z-axis) of the plurality of lenses provided in the camera module 2 may be formed in a width direction or a longitudinal direction of the portable electronic device 1.

Therefore, even in a case in which the camera module 2 has functions such as autofocusing (AF), optical zoom (Zoom) and optical image stabilization (OIS) and the like, a thickness of the portable electronic device 1 may be prevented from increasing. Thus, the portable electronic device 1 may be downsized.

The camera module 2 according to an example may include at least one of AF, Zoom, and OIS functions.

In the case of the camera module 2 having AF, Zoom and OIS functions, the size of the camera module 2 is increased as compared with a general camera module.

If the size of the camera module 2 is increased, since such an increase in size also affects the size of the portable electronic device 1 on which the camera module 2 is mounted, there is a limit in the miniaturization of the portable electronic device 1.

For example, in the case of the camera module, it needs to change a focal length to implement the Zoom function. In this case, a space in which at least a portion of the plurality of lenses is moved is required.

However, in the case in which the optical axis (z-axis) of the plurality of lenses is formed in the thickness direction (y-axis direction) of the portable electronic device 1, the thickness of the portable electronic device 1 also increases. In the case in which the thickness of the portable electronic device 1 is not increased, the space for movement of the lens is insufficient, so that it is difficult to implement the zoom function.

To implement the AF and OIS functions, an actuator for moving a plurality of lenses in an optical axis direction and in a direction perpendicular to the optical axis should be provided. In a case in which the optical axis (z-axis) of the plurality of lenses is formed in the thickness direction (y-axis direction) of the portable electronic device 1, the thickness of the portable electronic device 1 is increased due to the actuator.

However, since the camera module 2 according to various examples described above is disposed such that the optical axis (z-axis) of the plurality of lenses is perpendicular to the thickness direction (y-axis direction) of the portable electronic device 1, even when the camera module 2 having the AF, Zoom and OIS functions, and the like, is mounted on the portable electronic device 1, the thickness of the portable electronic device 1 may be prevented from increasing. Therefore, the portable electronic device 1 may be downsized.

Figure 22:
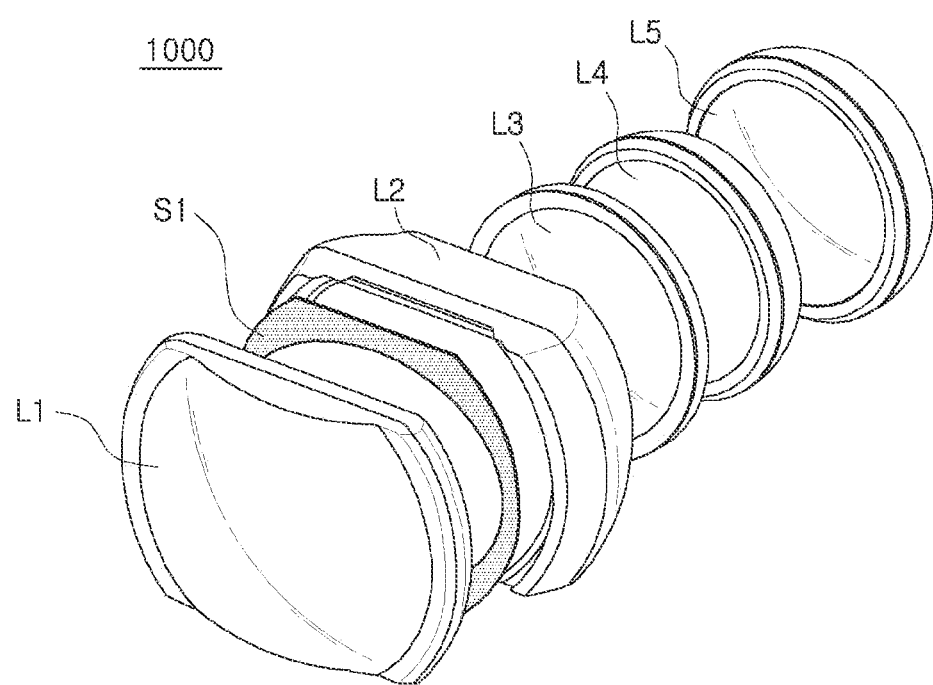
FIG. 22 is a schematic perspective view of an optical imaging system according to an example.

FIG. 22 is a schematic perspective view of an optical imaging system 1000 according to an example.

Referring to FIG. 22, an optical imaging system 1000 according to an example includes a plurality of lenses L1, L2, L3, L4 and L5 and a spacer S1.

Although not illustrated in the drawings, the optical imaging system 1000 may further include a reflecting member disposed closer to an object than the plurality of lenses, and also, may further include an infrared cut filter and an image sensor.

For example, the optical imaging system 1000 may be any one of the optical imaging systems according to the first to fifth examples described above.

The reflecting member is disposed in front of the plurality of lenses L1, L2, L3, L4 and L5, and is configured to change a traveling direction of light. Therefore, a path of light incident on the camera module 2 may be changed by the reflecting member.

As an example, the light incident on the camera module 2 may be changed such that a travel direction of light is toward the plurality of lenses L1, L2, L3, L4 and L5 by the reflecting member.

The reflecting member may be a mirror or a prism that reflects light.

The plurality of lenses L1, L2, L3, L4 and L5 includes a first lens L1, a second lens L2, a third lens L3, and a fourth lens L4 and a fifth lens L5 disposed sequentially from an object side to an image side. If necessary, six or more lenses may be provided.

The plurality of lenses L1, L2, L3, L4 and L5 are spaced apart from each other.

At least portions of the plurality of lenses L1, L2, L3, L4 and L5 have a non-circular planar shape. For example, the first lens L1 and the second lens L2 may be formed to have a non-circular shape, and the third lens L3 to the fifth lens L5 may be formed to have a circular shape.

In this case, the term 'circular' does not mean only a complete circle, but may be meant to include a shape in which a gate of a plastic injection lens is removed (for example, a portion of the circle is cut off).

Therefore, the third lens L3 to the fifth lens L5 may have a shape in which the gate, which is a moving path of a resin material, is removed (for example, a portion of the circle is cut off).

'Non-circular' may indicate that the lens is not circular in a region other than the gate of the plastic injection lens.

The first lens L1 has four side surfaces, and the two side surfaces are formed to face each other. Further, the sides facing each other have corresponding shapes.

For example, when viewed in the optical axis direction, a first side surface and a second side surface of the first lens L1 are arc-shaped, and a third side surface and a fourth side surface are substantially linear. The gate, which is a moving path of a resin material, may be formed on either the first side surface or the second side surface.

The shape of the second lens L2 is substantially similar to the shape of the first lens L1, and the first lens L1 will be described below for convenience of explanation.

Figure 23:
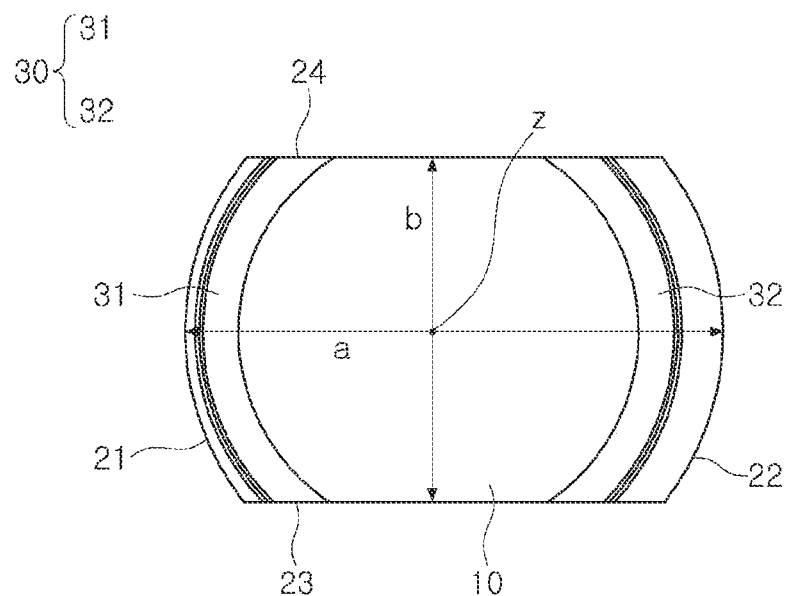
FIGS. 23 and 24 are plan views of a first lens of an optical imaging system according to an example.
Figure 24:
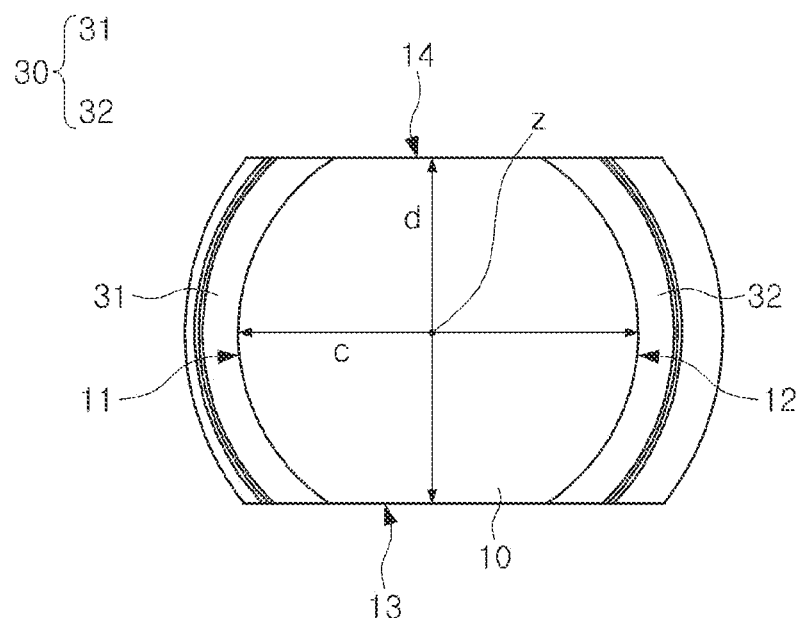

FIGS. 23 and 24 are plan views of a first lens of an optical imaging system according to an example.

Referring to FIG. 23, when viewed in the optical axis direction, a first side surface 21 and a second side surface 22 of the first lens L1 are arc-shaped, and a third side surface 23 and a fourth side surface 24 are substantially linear. The gate, which is a moving path of a resin material, may be formed on either the first side surface 21 or the second side surface 22.

The third side surface 23 and the fourth side surface 24 respectively connect the first side surface 21 and the second side surface 22.

The third side surface 23 and the fourth side surface 24 are symmetrical about the optical axis, and may be formed parallel to each other.

The first lens L1 has a major axis and a minor axis b. As an example, when viewed in the optical axis direction, a line segment, passing through the optical axis (z-axis) and connecting the third side surface 23 and the fourth side surface 24 at a shortest distance, is the minor axis b, and a line segment, passing through the optical axis (z-axis), connecting the first side surface 21 and the second side surface 22 and perpendicular to the minor axis b, is the major axis a.

A length of the major axis a of the first lens L1 is greater than a length of the minor axis b.

The first lens L1 includes an optical portion 10 and a flange portion 30.

The optical portion 10 may be a portion in which optical performance of the first lens L1 is exerted. In an example, light reflected from a subject may be refracted while passing through the optical portion 10.

The optical portion 10 may have refractive power, and may have a spherical or aspherical shape.

The flange portion 30 may be a portion that fixes the first lens L1 to another element, for example, a lens barrel or the second lens L2.

The flange portion 30 extends around at least a portion of the optical portion 10 and may be formed integrally with the optical portion 10.

The optical portion 10 and the flange portion 30 are formed to have a non-circular shape. For example, the optical portion 10 and the flange portion 30 are non-circular when viewed in the optical axis direction (see FIG. 23).

Referring to FIG. 24, the optical portion 10 includes a first edge 11, a second edge 12, a third edge 13, and a fourth edge 14, and the first edge 11 and the second edge 12 are located opposite to each other, and the third edge 13 and the fourth edge 14 are located opposite to each other.

The third edge 13 and the fourth edge 14 respectively connect the first edge 11 and the second edge 12.

The first edge 11 and the second edge 12 have an arc shape and the third edge 13 and the fourth edge 14 have a substantially linear shape, when viewed in the optical axis direction.

The third edge 13 and the fourth edge 14 are symmetrical about the optical axis (z-axis) and may be formed parallel to each other.

The optical portion 10 has a major axis c and a minor axis d. As an example, when viewed in the optical axis direction, a line segment, passing through the optical axis (z-axis) and connecting the third edge 13 and the fourth edge 14 at a shortest distance, is the minor axis d, and a line segment, passing through the optical axis (z-axis), connecting the first edge 11 and the second edge 12 and perpendicular to the minor axis d, is the major axis c.

A length of the major axis c of the optical portion 10 is greater than a length of the minor axis d.

The flange portion 30 includes a first flange portion 31 and a second flange portion 32. The first flange portion 31 extends from the first edge 11 of the optical portion 10, and the second flange portion 32 extends from the second edge 12 of the optical portion 10.

The first edge 11 of the optical portion 10 may refer to a portion adjacent to the first flange portion 31, and the second edge 12 of the optical portion 10 may refer to a portion adjacent to the second flange portion 32.

The third edge 13 of the optical portion 10 may refer to one side surface of the optical portion 10 on which the flange portion 30 is not formed, and the fourth edge 14 of the optical portion 10 may refer to the other side surface of the optical portion 10 on which the flange portion 30 is not formed.

The first lens L1 is formed of a plastic material and injection-molded through a mold. In this case, the third edge 13 and the fourth edge 14 of the first lens L1 according to this example are not formed by cutting a portion of the lens after the injection molding, but are manufactured to have the above shape in the injection molding process.

In a case in which a portion of the lens is removed after injection molding, the lens may be deformed by the force applied to the lens in the course thereof. If the lens is deformed, the optical performance of the lens is inevitably changed.

However, since the first lens L1 according to this example is formed to have a non-circular shape when the first lens L1 is injected, the size of the first lens L1 may be reduced, and performance may also be ensured.

Figure 25:
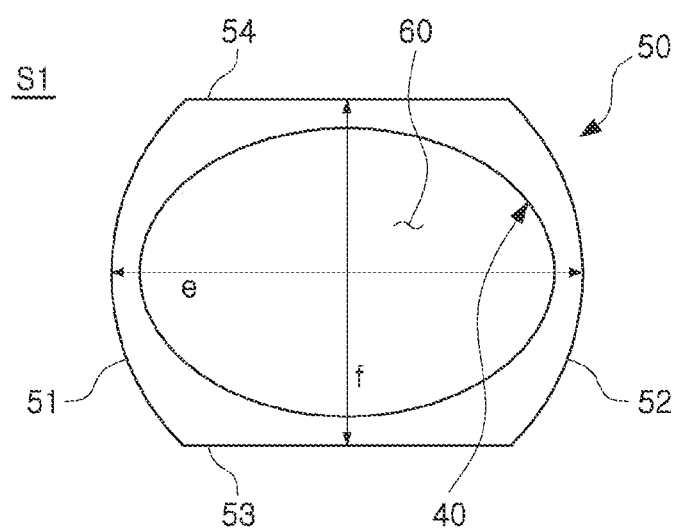
FIGS. 25 and 26 are plan views of a first spacer of an optical imaging system according to an example.
Figure 26:
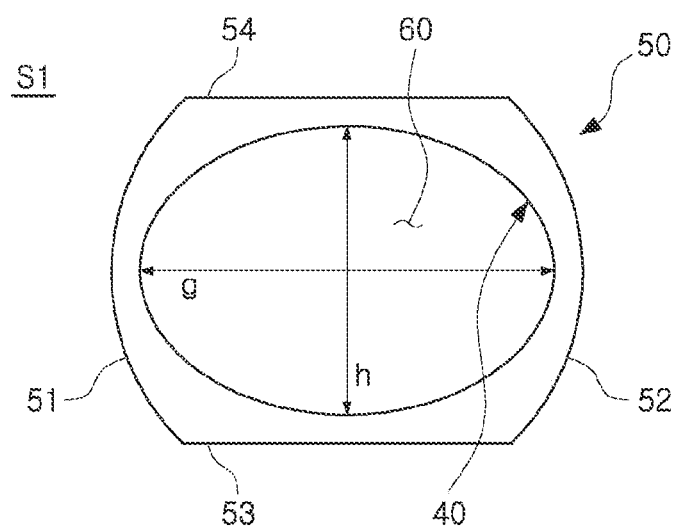

FIGS. 25 and 26 are plan views of a first spacer of an optical imaging system according to an example.

First, a spacer (such as spacer S1) may be provided between adjacent lenses (see FIG. 22).

The spacers may maintain spacing between the lenses and may block unnecessary light. As an example, the spacer may be provided with a light absorbing layer to shield unnecessary light. The light absorbing layer may be a black coating or black iron oxide.

The spacer includes a first spacer S1, a second spacer, a third spacer and a fourth spacer arranged from an object side toward the image.

The first spacer S1 is disposed between the non-circular lenses. For example, the first spacer S1 is disposed between the first lens L1 and the second lens L2.

The second spacer is disposed between the second lens L2 and the third lens L3, and the third spacer is disposed between the third lens L3 and the fourth lens L4, and the fourth spacer is disposed between the lens L4 and the fifth lens L5. For reference, only the first spacer S1 is illustrated in FIG. 22.

Referring to FIG. 25, the first spacer S1 has an opening 60 through which light passes. The opening 60 is formed by an inner circumferential surface 40 of the first spacer S1. For example, the space surrounded by the inner circumferential surface 40 of the first spacer S1 serves as the opening 60.

An outer circumferential surface 50 of the first spacer S1 is non-circular when viewed in the optical axis direction, and the inner circumferential surface 40 of the first spacer S1 is also non-circular when viewed in the optical axis direction.

The outer circumferential surface 50 of the first spacer S1 may correspond to the shape of the first lens L1. As an example, the outer circumferential surface 50 of the first spacer S1 includes a first outer side surface 51, a second outer side surface 52, a third outer side surface 53 and a fourth outer side surface 54.

The first outer side surface 51 and the second outer side surface 52 are opposite to each other and have corresponding shapes. The third outer side surface 53 and the fourth outer side surface 54 are opposite to each other and have corresponding shapes.

The first outer side surface 51 and the second outer side surface 52 are arc-shaped while the third outer side surface 53 and the fourth outer side surface 54 are substantially linear, when viewed in the optical axis direction.

The third outer side surface 53 and the fourth outer side surface 54 respectively connect the first outer side surface 51 and the second outer side surface 52.

The third outer side surface 53 and the fourth outer side surface 54 are symmetrical about the optical axis and may be formed to be parallel to each other.

The outer circumferential surface 50 of the first spacer S1 has a major axis e and a minor axis f. As an example, when viewed in the optical axis direction, a line segment, passing through the optical axis (z-axis) and connecting the third outer side surface 53 and the fourth outer side surface 54 at a shortest distance, is the minor axis f, and a line segment, passing through the optical axis (z-axis), connecting the first outer side surface 51 and the second outer side surface 52 and perpendicular to the minor axis f, is the major axis e.

The length of the major axis e of the outer peripheral surface 50 is greater than the length of the minor axis f.

The shape of the inner circumferential surface 40 of the first spacer S1 is formed differently from the shape of the outer circumferential surface 50.

In an example, the inner circumferential surface 40 of the first spacer S1 may be elliptical. Therefore, the inner circumferential surface 40 of the first spacer S1 has a major axis g and a minor axis h (see FIG. 26). The length of the major axis g of the inner circumferential surface 40 is greater than the length of the minor axis h.

Since the third edge 13 and the fourth edge 14 of the optical portion 10 of the first lens L1 are substantially linear when viewed in the optical axis direction, a linear diffraction pattern occurs in a captured image due to a diffraction phenomenon of light passing therethrough.

However, in the optical imaging system 1000 according to an example, the inner circumferential surface 40 of the first spacer S1 disposed between the first lens L1 and the second lens L2 has an elliptical shape, such that a linear diffraction pattern may be removed.

A difference f–h between the length of the minor axis f of the outer circumferential surface 50 and the length of the minor axis h of the inner circumferential surface 40 is greater than a difference e–g between the length of the major axis e of the outer circumferential surface 50 and the length of the major axis g of the inner circumferential surface 40.

Figure 27:
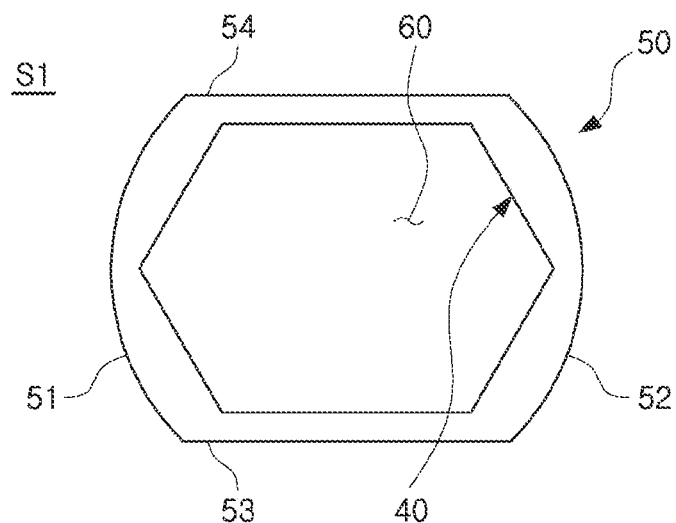
FIGS. 27 and 28 are views illustrating another example of the first spacer according to an example.
Figure 28:
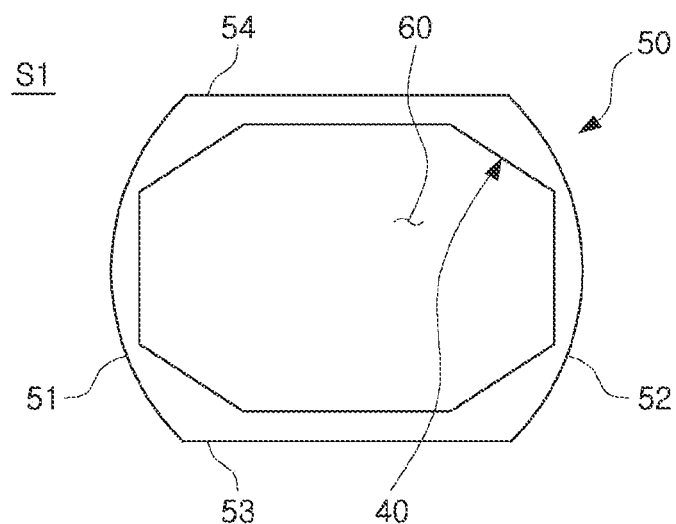

FIGS. 27 and 28 are views illustrating another example of the first spacer.

Referring to FIGS. 27 and 28, the inner circumferential surface 40 of the first spacer S1 may have a polygonal shape.

As an example, the inner circumferential surface 40 of the first spacer S1 may be a polygon having five or more sides when viewed in the optical axis direction.

In the example of FIG. 27, the inner circumferential surface 40 of the first spacer S1 has a hexagonal shape, and in the example of FIG. 28, the inner circumferential surface 40 of the first spacer S1 has an octagonal shape.

Thus, the optical imaging system 1000 according to an example may adjust a diffraction pattern of light through the shape of the inner circumferential surface 40 of the first spacer S1.

Figure 29:
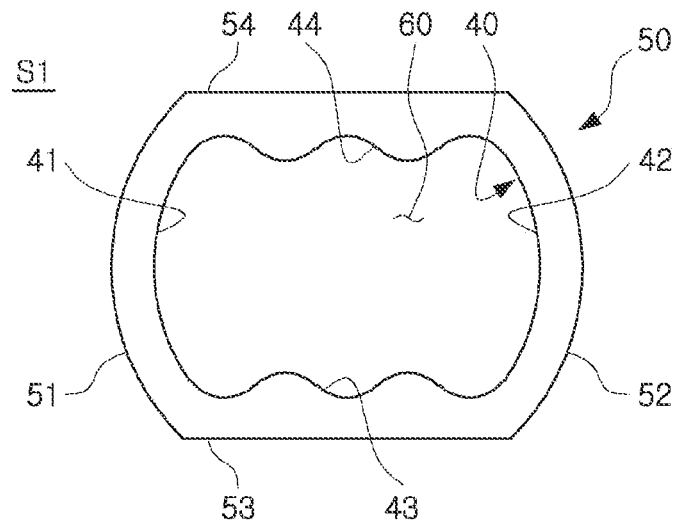
FIGS. 29 and 30 are views illustrating another example of the first spacer according to an example.
Figure 30:
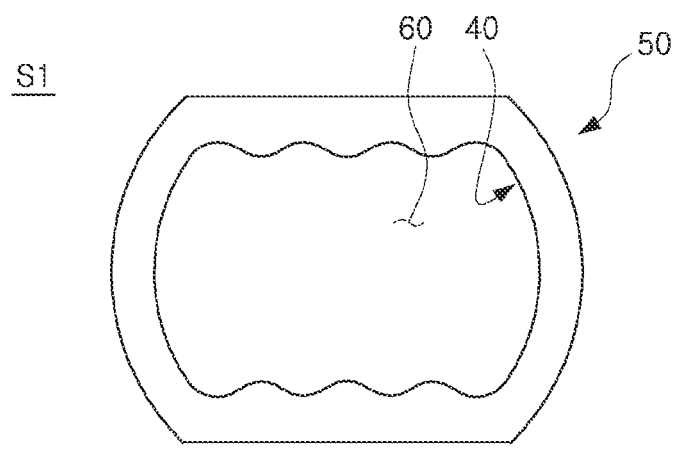

FIGS. 29 and 30 are views illustrating another example of the first spacer.

Referring to FIGS. 29 and 30, the shape of the first spacer S1 in this example differs from the shape of the inner circumferential surface 40 in the example illustrated in FIG. 25.

The outer circumferential surface 50 of the first spacer S1 is non-circular when viewed in the optical axis direction, and the inner circumferential surface 40 of the first spacer S1 is also non-circular when viewed in the optical axis direction.

The shape of the inner circumferential surface 40 of the first spacer S1 is formed differently from the shape of the outer circumferential surface 50.

In an example, the inner circumferential surface 40 of the first spacer S1 includes a first inner side surface 41, a second inner side surface 42, a third inner side surface 43, and a fourth inner side surface 44.

The first inner side surface 41 and the second inner side surface 42 face each other and have corresponding shapes, and the third inner side surface 43 and the fourth inner side surface 44 face each other and have corresponding shapes.

The first inner side surface 41 and the second inner side surface 42 are arc-shaped when viewed in the optical axis direction. The third inner side surface 43 and the fourth inner side surface 44 respectively connect the first inner side surface 41 and the second inner side surface 42.

Since the third inner side surface 43 and the fourth inner side surface 44 have shapes corresponding to each other, the third inner side surface 43 will be mainly described below.

The third inner side surface 43 includes a curved surface. The third inner side surface 43 may be formed to have a wavy shape when viewed in the optical axis direction.

In an example, the third inner side surface 43 may include at least one convex curved surface and at least one concave curved surface.

The convex curved surface and the concave curved surface may be alternately formed. As an example, a concave curved surface and a convex curved surface may be alternately formed in a direction from the first inner side surface 41 to the second inner side surface 42.

The third inner side surface 43 has a concave curved surface on a portion of connection of the first inner side surface 41 and the second inner side surface 42, and may have at least one convex curved surface formed between the concave curved surfaces.

Since the third edge 13 and the fourth edge 14 of the optical portion 10 of the first lens L1 are substantially linear when viewed in the optical axis direction, a linear diffraction pattern occurs in a captured image due to a diffraction phenomenon of light passing therethrough.

However, in the case of the optical imaging system 1000 according to an example, since in the inner circumferential surface 40 of the first spacer S1 disposed between the first lens L1 and the second lens L2, the third inner side surface 43 and the fourth inner side surface 44 each include at least one concave curved surface and at least one convex curved surface, such a linear diffraction pattern may be eliminated.

With reference to the above examples, in an optical imaging system 1000, unnecessary diffraction patterns may be removed or controlled.

As set forth above, according to the examples, a slim optical imaging system may be implemented while having a narrow angle of view.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system comprising:
a first lens having positive refractive power, a convex object-side surface and a convex image-side surface;
a second lens having negative refractive power, a convex object-side surface and a concave image-side surface;
a third lens having positive refractive power; and
a fourth lens having positive refractive power,
wherein the first to fourth lenses are arranged sequentially from an object side along an optical axis of the optical imaging system,
wherein $1.3<TTL/BFL<3.3$ is satisfied, where TTL is a distance on the optical axis from the object-side surface of the first lens to an imaging surface, and BFL is a distance on the optical axis from an image-side surface of the fourth lens to the imaging surface, and
wherein $f/IMG\ HT>4.9$ is satisfied, where f is a total focal length of the optical imaging system, and IMG HT is half of a diagonal length of the imaging surface.

2. The optical imaging system of claim 1, wherein $0.8<TTL/f<1.2$ is satisfied.

3. The optical imaging system of claim 1, wherein $3.8<f/TD12<7$ is satisfied, where TD12 is a distance on the optical axis from the object-side surface of the first lens to the image-side surface of the second lens.

4. The optical imaging system of claim 1, wherein an effective aperture radius of the object-side surface of the first lens and an effective aperture radius of the object-side surface of the second lens are both greater than an effective aperture radius of an object-side surface and an effective aperture radius of an image-side surface of each of the lenses other than the first lens and the second lens.

5. The optical imaging system of claim 1, wherein $ER11/ER\_max>1.1$, where ER11 is an effective aperture radius of the object-side surface of the first lens, and ER_max is a maximum value of an effective aperture radius of an object-side surface and an effective aperture radius of an image-side surface of each of the lenses other than the first lens and the second lens.

6. The optical imaging system of claim 5, wherein $ER11/ER51>1.1$, where ER51 is an effective aperture radius of an object-side surface of the fourth lens.

7. The optical imaging system of claim 1, wherein $ER21/ER\_max>1.0$, where ER21 is an effective aperture radius of the object-side surface of the second lens, and ER_max is a maximum value of an effective aperture radius of an object-side surface and an effective aperture radius of an image-side surface of each of the lenses other than the first lens and the second lens.

8. The optical imaging system of claim 7, wherein ER21/ER51>1.0, where ER51 is an effective aperture radius of an object-side surface of the fourth lens.

9. The optical imaging system of claim 1, wherein a focal length f1 of the first lens is less than half of the total focal length f, and f1 is greater than an absolute value of a focal length f2 of the second lens.

10. The optical imaging system of claim 1, wherein the third lens has a convex object-side surface.

11. The optical imaging system of claim 10, wherein the fourth lens has a convex object-side surface and a concave image-side surface.

12. The optical imaging system of claim 1, wherein at least one of the first lens and the second lens has a noncircular shape when viewed in the optical axis direction.

13. The optical imaging system of claim 12, wherein the at least one of the first lens and the second lens having a noncircular shape comprises a first edge and a second edge having an arc shape, and a third edge and a fourth edge connecting the first edge and the second edge to each other, and a length of a virtual straight line connecting the first edge and the second edge, while passing through the optical axis, is greater than a length of a virtual straight line connecting the third edge and the fourth edge, while passing through the optical axis.

14. The optical imaging system of claim 12, wherein the first lens has a noncircular shape when viewed in the optical axis direction,
a spacer having an opening is disposed between the first lens and the second lens, and
the opening of the spacer has a noncircular shape when viewed in the optical axis direction.

15. The optical imaging system of claim 14, wherein the spacer has an inner circumferential surface defining the opening,
wherein the inner circumferential surface comprises a first inner side surface and a second inner side surface having an arc shape, and a third inner side surface and a fourth inner side surface connecting the first inner side surface and the second inner side surface to each other, and
wherein the third inner side surface and the fourth inner side surface each include at least one concave curved surface and at least one convex curved surface.

16. The optical imaging system of claim 15, wherein the at least one concave curved surface and the at least one convex curved surface are alternated along the third inner side surface and the fourth inner side surface.

17. The optical imaging system of claim 1, further comprising a reflecting member disposed in front of the first lens,
wherein the reflecting member has a reflective surface for changing an optical path.

18. The optical imaging system of claim 17, wherein the reflecting member is a mirror or a prism.

* * * * *